US007154732B2

(12) United States Patent
Bennett et al.

(10) Patent No.: US 7,154,732 B2
(45) Date of Patent: Dec. 26, 2006

(54) APPARATUS AND SYSTEM FOR CONTROLLING A SQUIB FIRING DEVICE

(75) Inventors: David D. Bennett, Clinton, WA (US); Michael E. Ernst, Snohomish, WA (US); Randall P. Keller, Snohomish, WA (US); Douglas S. York, Langley, WA (US)

(73) Assignee: The Boeing Company, Chicago, IL (US)

( * ) Notice: Subject to any disclaimer, the term of this patent is extended or adjusted under 35 U.S.C. 154(b) by 589 days.

(21) Appl. No.: 10/405,124

(22) Filed: Apr. 1, 2003

(65) Prior Publication Data

US 2004/0196615 A1 Oct. 7, 2004

(51) Int. Cl.
*B60L 1/00* (2006.01)
*F23Q 7/24* (2006.01)
*H05B 43/02* (2006.01)

(52) U.S. Cl. ........................................ 361/248; 307/9.1
(58) Field of Classification Search ................ 361/248; 307/9.1
See application file for complete search history.

(56) References Cited

U.S. PATENT DOCUMENTS

| | | | | |
|---|---|---|---|---|
| 3,619,792 A | | 11/1971 | Capeci et al. ............... | 328/130 |
| 4,540,964 A | | 9/1985 | Bleeke ........................ | 335/205 |
| 5,596,497 A | * | 1/1997 | Honda .......................... | 701/45 |
| 5,621,326 A | | 4/1997 | Watanabe et al. ........... | 324/502 |
| 5,749,059 A | * | 5/1998 | Walton ......................... | 701/45 |
| 5,859,583 A | * | 1/1999 | Mayumi et al. ............. | 340/436 |
| 6,300,764 B1 | | 10/2001 | Kelley ......................... | 324/502 |

OTHER PUBLICATIONS

Electromechcomp.com web page printout, Sep. 23, 2002, p. 1-8.
Component Maintenance Manual with Illustrated Parts List—Emergency Door Open Power Assist System (EPA) Battery Pack, Part No. BPAS10-1 by Derian Incorporated of Santa Ana, California.

* cited by examiner

*Primary Examiner*—Brian Sircus
*Assistant Examiner*—Hal I. Kaplan
(74) *Attorney, Agent, or Firm*—Robert R. Richardson, P.S.

(57) ABSTRACT

A squib firing device is constructed to test and fire a squib load being applied to the squib firing device. A power supply of the squib firing device conditionally stores and discharges a squib firing power, which is a function of an analog OR of a first voltage from an external power source and a second voltage from a battery source of the squib firing device. When the squib firing power is being stored by the power supply, the squib firing device establishes a flow of a squib testing current through the applied squib load to thereby detect a resistance of squib load. When the squib firing power is being discharged by the power supply, the squib firing device establishes and regulates a flow of a squib firing current through the applied squib load to thereby fire squib load.

19 Claims, 17 Drawing Sheets

APPARATUS AND SYSTEM FOR CONTROLLING A SQUIB FIRING DEVICE

FIELD OF THE INVENTION

The present invention generally relates to systems and devices for firing a squib. More specifically, the present invention relates to systems and device for storing and releasing energy required to test and fire a squib.

BACKGROUND OF THE INVENTION

Squib systems are utilized in many applications, such as, for example, fire fighting, launch control, emergency power assist systems ("EPAS"), emergency escape slides, and other staging applications throughout industries, such as, for example, aircraft, automotive, agriculture, military and space technology. One known EPAS employs a squib firing device in the form of a line replacement unit installed in a door of a commercial passenger aircraft. The squib firing device assists people aboard the airplane in opening the airplane door in an emergency situation by providing the power required to fire a squib also mounted in or adjacent the airplane door. These squib firing devices historically incorporate a power supply and/or a rechargeable battery for supplying the necessary power to fire the squib. The present invention advances the prior art by contributing a new and unique system and device for testing and firing a squib load.

SUMMARY OF THE INVENTION

One form of a squib firing system constructed in accordance with the present invention comprises a squib load, a system power source and a squib firing device. The system power source generates a first voltage and the squib firing device includes a battery source for generating a second voltage. The squib firing device further includes a power supply receiving the first voltage from the system power source and receiving the second voltage from the battery source. In response to the squib firing device being switched to an armed mode and in the absence of squib load being applied to the squib firing device, the power supply implements an analog OR of the first voltage and the second voltage to yield and store a squib firing power. In response to the squib firing device being switched to the armed mode and squib load being applied to the squib firing device, the power supply discharges the squib firing power to establish a flow of a squib firing current through squib load whereby squib load is fired.

A second form of a squib firing device constructed in accordance with the present invention comprises a battery source and a squib controller. The battery source generates a second voltage. The squib controller includes a power supply receiving a first voltage from a power source and receiving the second voltage from the battery source. In response to the squib controller being switched to an armed mode and in the absence of a squib load being applied to the squib controller, the power supply implements an analog OR of the first voltage and the second voltage to yield and store a squib firing power. In response to the squib controller being switched to the armed mode and squib load being applied to the squib controller, the power supply discharges the squib firing power to establish a flow of a squib firing current through squib load whereby squib load is fired.

A third form of a squib firing device constructed in accordance with the present invention comprises an arming detector, an output switch, a battery source, an interface, and a power supply. The power supply receives a first voltage from an outside system power source via the interface and receives a second voltage from the battery source. In response a detection by the arming detector of the device being switched to an armed mode and in response to an absence of a squib load being applied to the output switch, the power supply implements an analog OR of the first voltage and the second voltage to yield and store a squib firing power. In response to a detection by the arming detector of the device being switched to the armed mode and in response to squib load being applied to the output switch, the power supply discharges the squib firing power to establish a flow of a squib firing current through squib load whereby squib load is fired.

The foregoing forms as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE INVENTION

Squib Firing System 20

Figure 1:
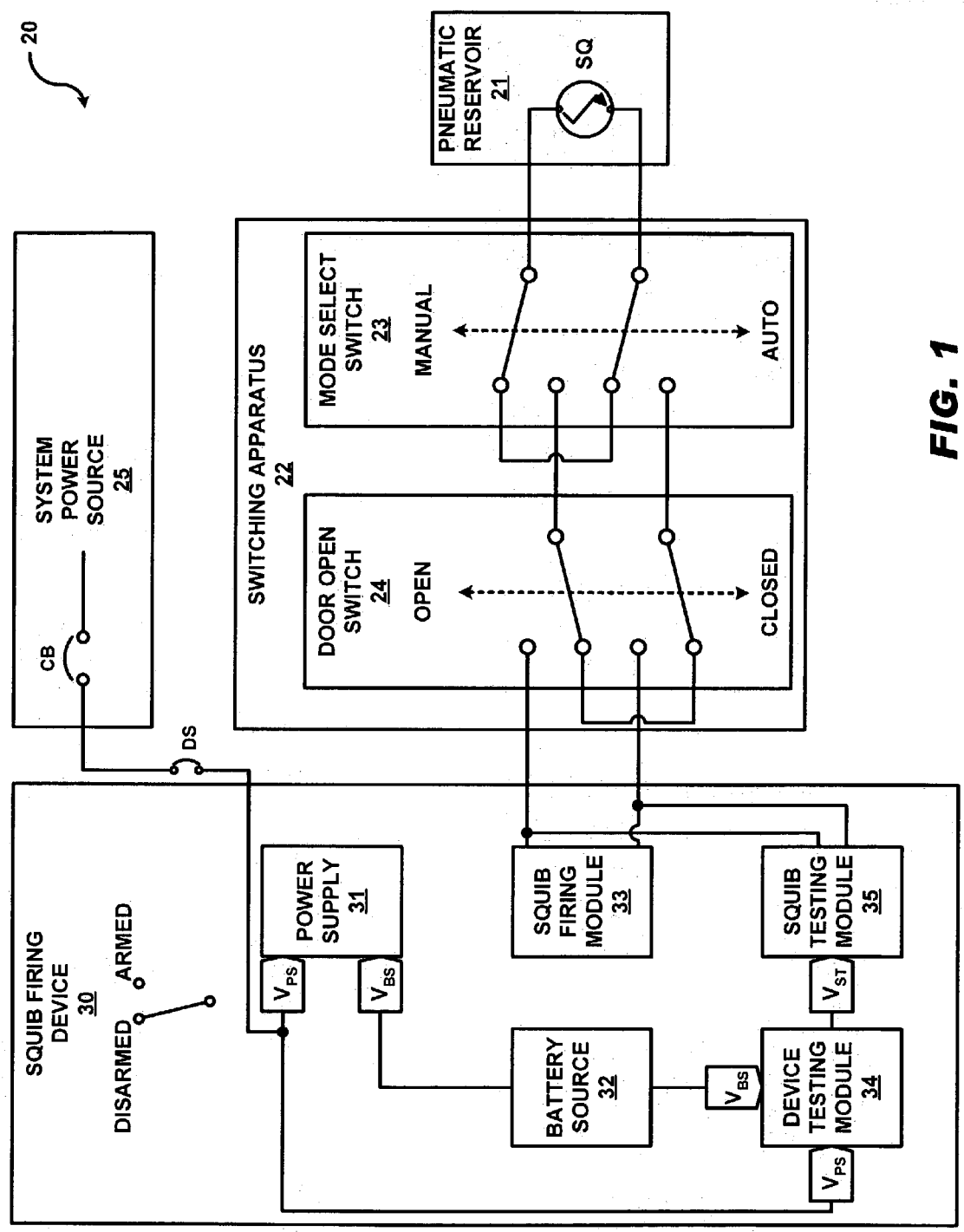
FIG. 1 illustrates one embodiment in accordance with the present invention of a squib firing system operating in an inactive mode.

FIGS. 1–4 illustrate a squib firing system 20 employing a new and unique squib firing device 30 for testing and firing any commercially available squib load. In the illustrated embodiment, system 20 employs a pneumatic reservoir 21 incorporating a squib load SQ for releasing high-pressure air that contributes to an opening of a door or any other type of movable structure utilized to close off an entrance. In one embodiment of system 20, pneumatic reservoir 21 is a gas bottle activator supplied by Pacific Scientific with a model number 2-501750-1

Squib load SQ is illustrated FIGS. 1–4 in an unfired state, which squib load SQ generally maintains until such time a squib firing current at an appropriate amperage range flows through squib load SQ until squib load SQ is fired. Device 30 operates in various modes for storing or discharging power for firing squib load SQ as will be subsequently described herein.

System 20 further employs any commercially available switching apparatus for selectively applying squib load SQ to device 30. In the illustrated embodiment, system 20 employs a conventional switching apparatus 22 electrically connected to pneumatic reservoir 21 and squib firing device 30. Switching apparatus 22 includes a mode select switch 23 that is switched between a manual state and an auto state. Switching apparatus 22 further includes a door open switch 24 that is switched between a closed state and an open state.

Switching apparatus 22 is capable of being switched between a plurality of operation modes including a pair of isolation modes and a coupling mode as set forth in the following TABLE 1:

TABLE 1

| | Apparatus 22 | |
| Operation Mode | Mode Select Switch 23 | Door Open Switch 24 |
| --- | --- | --- |
| 1$^{st}$ Isolation Mode (FIG. 1) | Manual State | Closed State |
| 2$^{nd}$ Isolation Mode (FIG. 2) | Auto State | Closed State |
| Coupling Mode (FIGS. 3 and 4) | Auto State | Open State |

Figure 2:
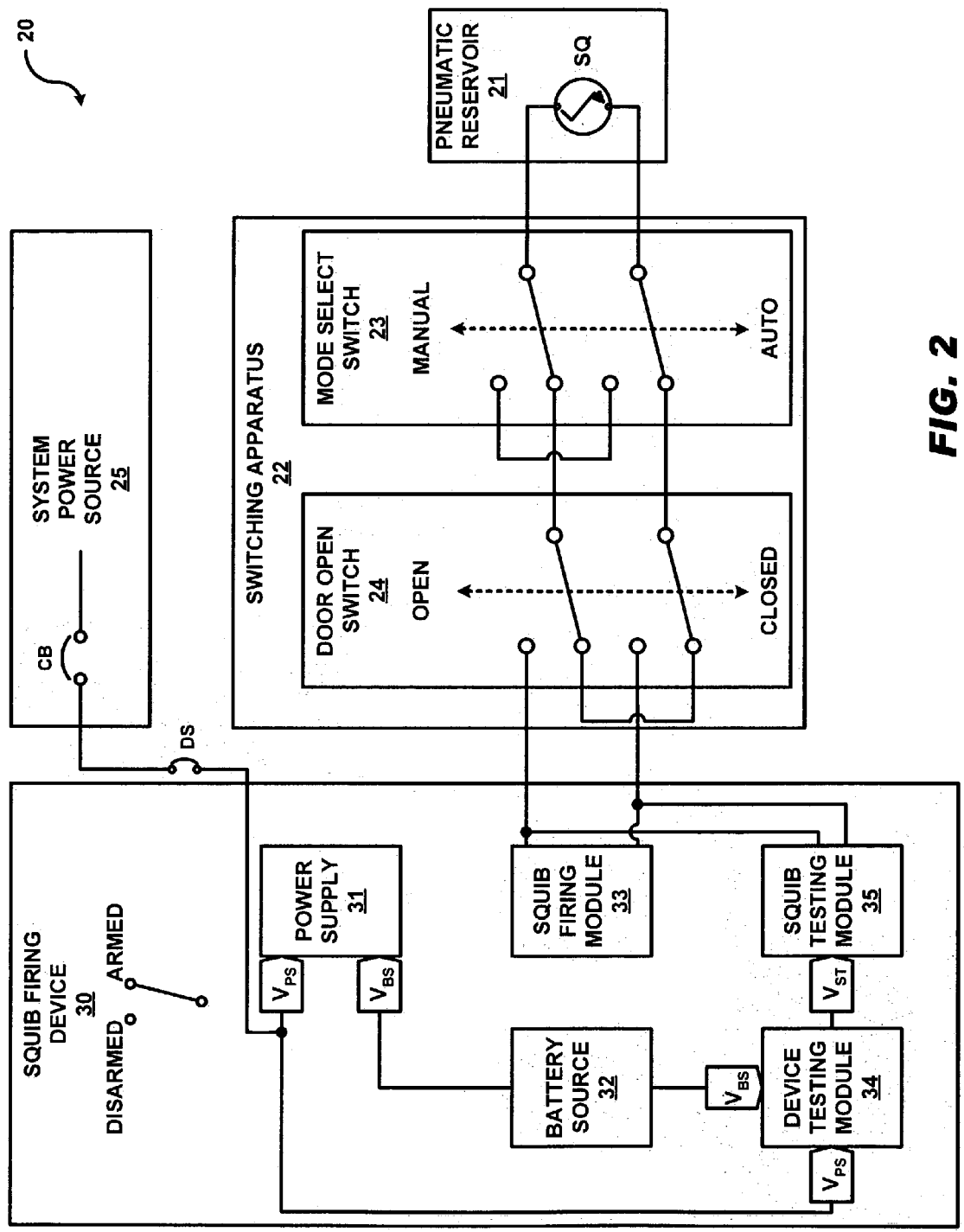
FIG. 2 illustrates the squib firing system illustrated in FIG. 1 operating in a fire disabled mode.
Figure 3:
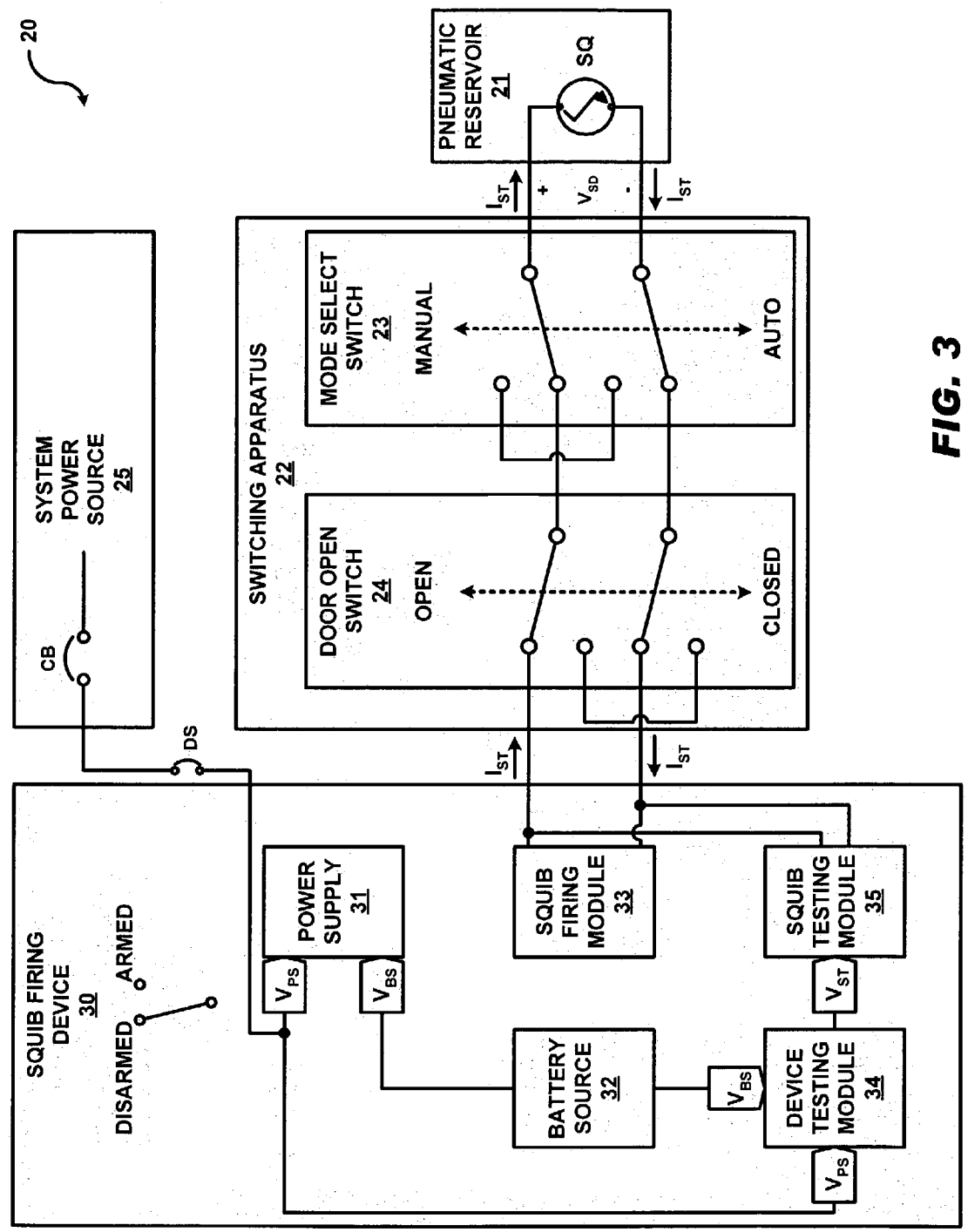
FIG. 3 illustrates the squib firing system illustrated in FIG. 1 operating in a fire enabled/disarmed mode.
Figure 4:
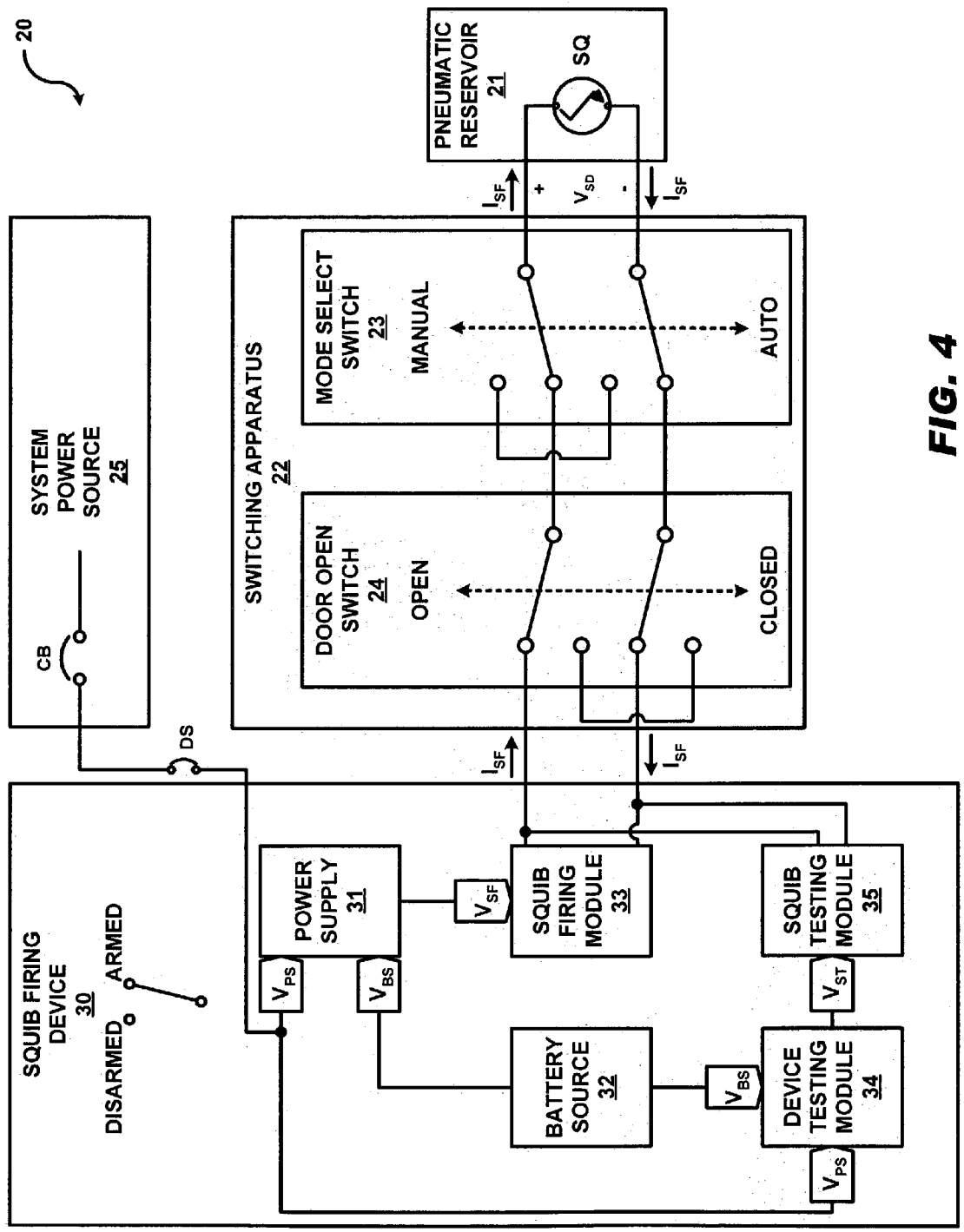
FIG. 4 illustrates the squib firing system illustrated in FIG. 1 operating in a fire enabled/armed mode.

The 1$^{st}$ and 2$^{nd}$ isolation modes for switching apparatus 22 electrically isolates pneumatic reservoir 21 from device 30 as illustrated in FIGS. 1 and 2. In these modes, squib load SQ is not applied to device 30. The coupling mode for switching apparatus 22 electrically couples pneumatic reservoir 21 to device 30 as illustrated in FIGS. 3 and 4. For this mode, squib load SQ is applied to device 30.

Squib firing device 30 is switched between a disarmed mode as illustrated in FIGS. 1 and 3, and an armed mode as illustrated in FIGS. 2 and 4. System 20 is therefore capable of being switched between a plurality of operation modes including an inactive mode, a fire disabled mode, a fire enabled/disarmed mode, and a fire enabled/armed mode as set forth in the following TABLE 2:

TABLE 2

| | System 20 | |
| Operation Mode | Switching Apparatus 22 | Squib Firing Device 30 |
| --- | --- | --- |
| Inactive Mode (FIG. 1) | 1$^{st}$ Isolation Mode | Disarmed Mode |
| Fire Disabled Mode (FIG. 2) | 2$^{nd}$ Isolation Mode | Armed Mode |
| Fire Enabled/Disarmed Mode (FIG. 3) | Coupling Mode | Disarmed Mode |
| Fire Enabled/Armed Mode (FIG. 4) | Coupling Mode | Armed Mode |

The inactive mode and the fire disabled mode of system 20 electrically isolate pneumatic reservoir 21 from squib load SQ whereby squib load SQ is not applied to device 30. System 20 operates in the inactive mode whenever switch 23 is switched to the manual state, switch 24 is switched to the closed state and device 30 is switched to the disarmed mode as illustrated in FIG. 1. System 20 operates in the fire disabled mode whenever switch 23 is switched to the auto state, switch 24 is switched to the closed state, and device 30 is switched to the armed mode as illustrated in FIG. 2.

The fire enabled/disarmed mode and the fire enabled/armed mode of system 20 electrically couple device 30 to pneumatic reservoir 21 whereby squib load SQ is applied to device 30. System 20 operates in the fire enabled/disarmed mode whenever switch 23 is switched to the auto state, switch 24 is switched to the open state, and device 30 is switched to the disarmed mode as illustrated in FIG. 3. System 20 operates in the fire enabled/armed mode whenever switch 23 is switched to the auto state, switch 24 is switched to the open state, and device 30 is switched to the armed mode as illustrated in FIG. 4.

Power supply 31 of device 30 stores a squib firing power whenever system 20 is switched to the inactive, fire disabled, and fire enabled/disarmed modes as illustrated in FIGS. 1–3. Power supply 31 discharges the squib firing power whenever system 20 is switched to the fire enabled/armed mode as illustrated in FIG. 4.

To this end, a system power source 25 of any commercially available type is electrically connected to device 30 to provide a primary voltage $V_{PS}$ (e.g., 18–32 volts) to power supply 31 whenever system power source 25 is active (i.e., turned on). A circuit breaker CB illustrated within system power source 25 is representative of an ON/OFF characteristic of system power source 25. A disconnect DS illustrated as part of the electrical connection of system power source 25 to device 30 is representative of a potential electric isolation of device 30 from system power source 25 due to a break in the electrical connection of system power source 25 to device 30 for whatever reason.

A battery source 32 of device 30 therefore provides a backup voltage $V_{BS}$ (e.g., 13–18 volts) to power supply 31, which stores squib firing voltage $V_{SF}$ as a function of primary squib voltage $V_{PS}$ and backup squib voltage $V_{BS}$. In one embodiment, power supply 31 implements an analog OR operation on primary voltage $V_{PS}$ and backup voltage $V_{BS}$ to yield and store squib firing voltage $V_{SF}$ as will be exemplary explained in connection with the description of FIG. 11.

A device testing module 34 of device 30 monitors primary voltage $V_{PS}$ and backup voltage $V_{BS}$. Device testing module 34 outputs an indicator (e.g., visual or audio) as to a status of whether power supply 31 is receiving primary voltage $V_{PS}$ and backup voltage $V_{BS}$. In one embodiment, the indicator output of device testing module 34 is dependent upon whether primary voltage $V_{PS}$, backup voltage $V_{BS}$, or both primary voltage $V_{PS}$ and backup voltage $V_{BS}$ are exceeding a minimum voltage level (e.g.,: 13–18 volts).

When powered by primary voltage $V_{PS}$, device testing module 34 supplies squib testing module 35 with a squib testing voltage $V_{ST}$ as illustrated in FIGS. 1–4. As a result, squib testing module 35 is powered to establish a flow of a squib testing current $I_{ST}$ through apparatus 22 and squib load SQ whenever system 20 is switched to the fire enabled/disarmed mode of operation as illustrated in FIG. 3. Squib testing module 35 generates squib testing current $I_{ST}$ within an amperage range calculated to flow through squib load SQ without firing squib load SQ (e.g., squib testing current $I_{ST}$<50 milliamps).

To this end, squib testing module 33 establishes an appropriate voltage drop $V_{SD}$ across squib load SQ in view of an impedance in a circular current path between device 30 and squib load SQ (e.g., a total impedance of switching apparatus 22 and pneumatic reservoir 21≈1.7Ω). A return of squib testing current $I_{ST}$ to squib firing device 30 as sensed by squib testing module 35 indicates a resistance of squib load SQ being within a suitable range for firing squib load SQ (e.g., resistance of squib load SQ<8Ω). Upon such a sensing of squib testing current $I_{ST}$ by squib testing module 35, device testing module 34 outputs an indicator of the detected resistance of squib load SQ. As such, an operator or operators of system 20 can ascertain an operational readiness of squib load SQ to receive a flow of squib firing current $I_{SF}$ upon a switch of system 20 from the fire disabled mode (FIG. 2) or the fire enabled/disarmed mode (FIG. 3) to the fire enabled/armed mode (FIG. 4).

During the fire enabled/armed mode of system 20, squib load SQ is applied to device 30 whereby power supply 31 discharges squib firing voltage $V_{SF}$ or a portion thereof to squib firing module 33. In turn, module 33 establishes a flow of squib firing current $I_{SF}$ from power supply 31 through apparatus 22 and squib load SQ. To this end, squib firing module 33 establishes an appropriate voltage drop $V_{SD}$ across squib load SQ whereby squib firing current $I_{SF}$ is drawn from power supply 31 within an amperage range calculated to flow through squib load SQ until squib load SQ is fired (e.g., squib firing current $I_{SF}$>5.5 amps for a time period greater than 50 milliseconds). In one embodiment, squib firing module 33 applies a current limit to squib firing current $I_{SF}$ to thereby prevent a "dudding" of squib load SQ (e.g., squib firing current $I_{SF}$<10.0 amps).

One environment suitable for system 20 is in a commercial passenger airplane (e.g., a Boeing 777). In this environment, pneumatic reservoir 21, switching apparatus 22 and squib firing device 30 are mounted to an airplane door, and system power source 25 is a rectified power source of the airplane. In practice, an operator of system 20 will switch system 20 to the inactive mode as illustrated in FIG. 1 whenever the airplane is not in service or operation.

To test the resistance of squib load SQ when servicing the airplane, an operator of system 20 can switch system 20 from the inactive mode (FIG. 1) to the fire enabled/disarmed mode (FIG. 3). This can be accomplished by a sequential switching of switch 23 to the auto state, and switch 24 to the open state. As previously explained herein, in this mode, device testing module 34 will output an indicator as to a status of whether squib testing module 35 detects the resistance of squib load SQ. Accordingly, a failure of device testing module 34 to output the indicator informs the an operator of system 20 that squib load SQ is worthy of inspection to ascertain an operational status of squib load SQ.

To close and seal the airplane door after testing the resistance of squib load SQ, an operator of system 20 can switch system 20 from the fire enabled/disarmed mode (FIG. 3) to the fired disabled mode (FIG. 2). This can be accomplished by a sequential switching of switch 24 to the closed state and device 30 to the armed mode. As previously explained herein, in this mode, device testing module 34 will output an indicator as to a status of whether power supply 31 is receiving primary voltage $V_{PS}$ and backup voltage $V_{BS}$, particularly at minimum voltage level(s). Accordingly, a failure of device testing module 34 to output the indicator informs an operator of system 20 to inspect system power source 25 as well as the electrical connection of system power source 25 to device 30, and to inspect and replace, if necessary, battery source 32.

To fire squib load SQ in an emergency situation, an operator of system 20 can switch system 20 from the fire disabled mode (FIG. 2) to the fire enabled/armed mode (FIG. 4). This is accomplished by switching switch 24 to the open state to establish the flow of squib firing current $I_{SF}$ through squib load SQ until squib load SQ is fired.

Alternative Squib Firing Systems

In one alternative embodiment of system 20, a switching apparatus includes only one switch, such as, for example, door open switch 24. In this alternative embodiment, system 20 operates in a plurality of modes as set forth in the following TABLE 3:

TABLE 3

| | System 20 | |
|---|---|---|
| Mode | Door Open Switch 24 | Squib Firing Device 30 |
| Inactive Mode (FIG. 1) | Closed | Disarmed Mode |
| Fire Disabled Mode (FIG. 2) | Closed | Armed Mode |
| Fire Enabled/Disarmed Mode (FIG. 3) | Open | Disarmed Mode |
| Fire Enabled/Armed Mode (FIG. 4) | Open | Armed Mode |

In a second alternative embodiment of system 20, a switching apparatus includes three or more switches, such as for example, switches 23 and 24, and any additional switch. In this alternative embodiment, system 20 will operate in additional modes in dependence upon the nature of each switch.

In a third alternative embodiment of system 20, a switching apparatus 22 and squib SQ is continually applied to device 30. System 20 therefore operates in a pair modes as set forth in the following TABLE 4:

TABLE 4

| Mode | System 20 Squib Firing Device 30 |
|---|---|
| Fire Enabled/Disarmed Mode (FIG. 3) | Disarmed Mode |
| Fire Enabled/Armed Mode (FIG. 4) | Armed Mode |

In a fourth alternative embodiment of system 20, battery source 32 serves as the primary power source and the system power source 25 serves as the backup power source.

Squib Firing Device 40

Figure 5:
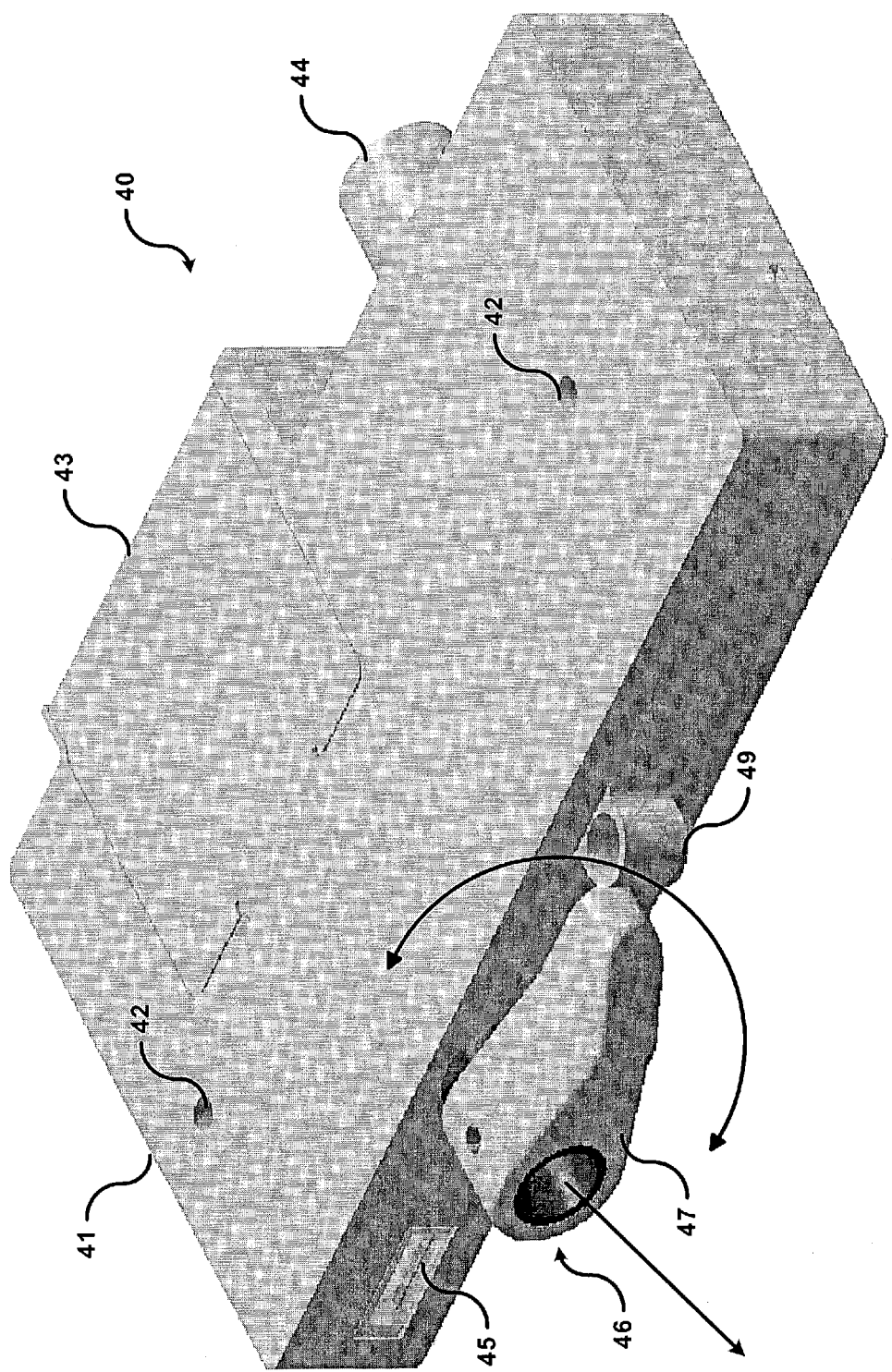
FIG. 5 illustrates an assembled view of one embodiment in accordance with the present invention of a squib firing device.
Figure 6:
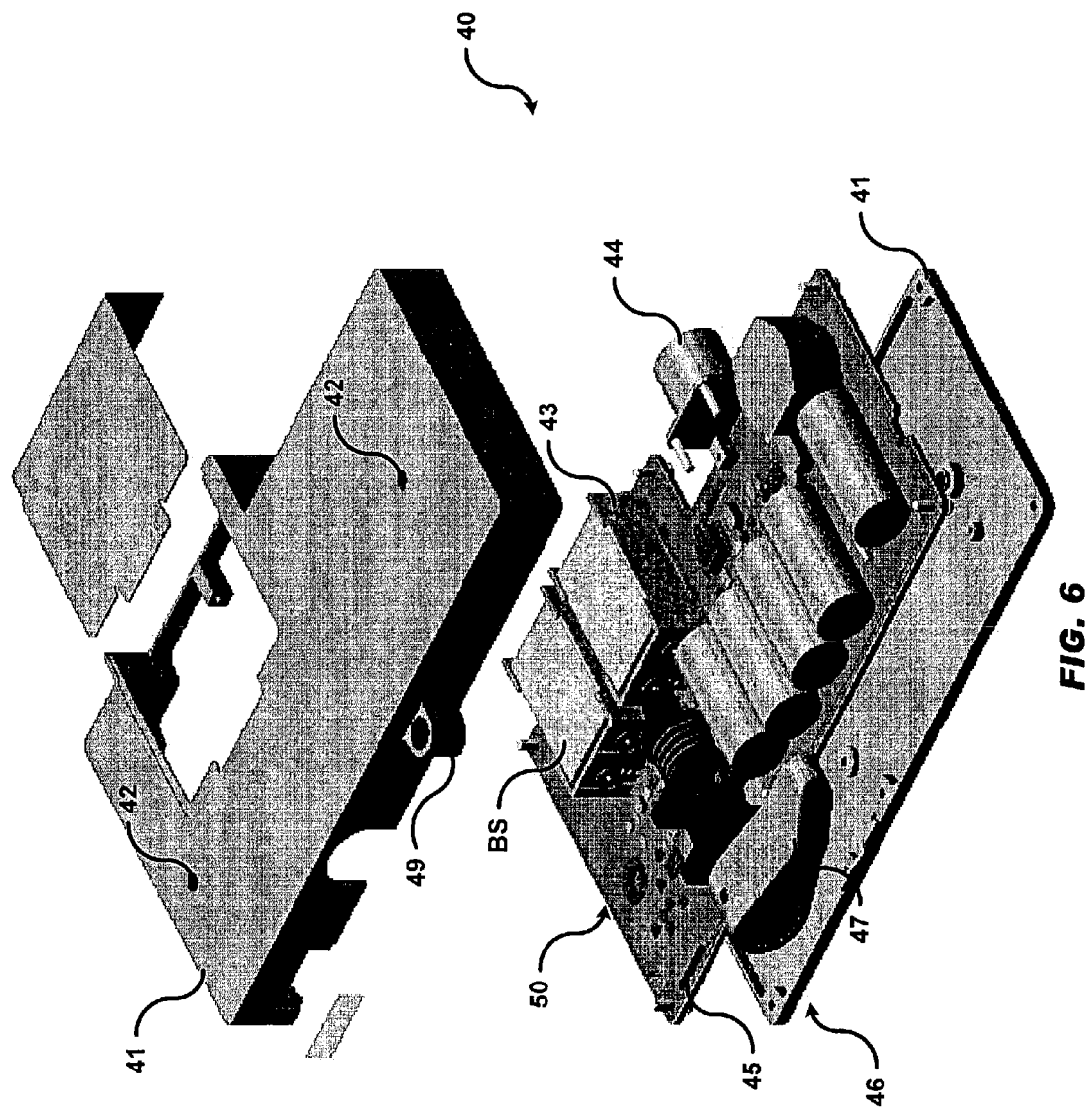
FIG. 6 illustrates an exploded view of the squib firing device illustrated in FIG. 5.

The illustrated components of squib firing device 30 (FIGS. 1–4) can be composed of analog or digital electronic components, electronic circuits, hardware, software, firmware or any combination thereof. The illustrated components of squib firing device 30 can also be assembled on one or more platforms. FIGS. 5 and 6 illustrate a squib firing device 40 as one embodiment of squib firing device 30.

Referring to FIGS. 5 and 6, a two-part casing 41 of device 40 supports an implementation of device 40 within system 20 (FIGS. 1–4) for testing and firing squib load SQ. In practice, the material used in fabricating casing 41 is dependent upon environmental factors corresponding to an implementation of device 40 in testing and firing squib load SQ. Preferably, whenever device 40 is affixed to a door via a pair of screw holes 42, casing 41 is fabricated from a metal (e.g., aluminum) or a plastic to thereby electrically isolate device 40 from a squib controller 50 (FIG. 6).

Device 40 employs squib controller 50 for implementing power supply 31, squib firing module 33, device testing module 34 and squib testing module 35 as illustrated in FIGS. 1–4. Squib controller 50 is enclosed with casing 41, and an operator of device 40 interacts with squib controller 50 via a battery compartment 43, a port 44, and an arm/disarm switch 46.

Battery compartment 43 allows an operator of device 40 to install and replace a battery source BS (FIG. 6) within battery compartment 43. Battery source BS serves as battery source 32 (FIGS. 1–4). In one embodiment, battery source BS includes a pair of 9 volt alkaline batteries (e.g., Duracell P/N MN1604 & PC1604,:Gold Peak (GP) P/N 1604A, and Panasonic P/N 6AM-6PI).

Port 44 allows an operator of device 40 to electrically connect an interface of squib controller 50 to switching apparatus 22 and system power source 25 (FIGS. 1–4). For alternative embodiments of system 20 omitting switching apparatus 22, port 44 allows an operator of device 40 to electrically connect an interface of squib controller 50 to pneumatic reservoir 21 and system power source 25.

Arm/disarm switch 46 includes a mechanical arm 47 and a magnet 48 (FIGS. 7 and 8) that allow an operator of device 40 to arm or disarm device 40. Mechanical arm 47 is illustrated in FIG. 5 in an arming position for device 40. To transition mechanical arm 47 to a disarming position of device 40, a operator of device 40 sequentially pulls mechanical arm 47 as represented by the straight arrow illustrated in FIG. 5, rotates mechanical arm 47 ninety degrees in either direction as represented by the curved bidirectional arrow illustrated in FIG. 5, and releases mechanical arm 47 into the disarming position of device 40 In the one embodiment, mechanical arm 47 is conventionally spring loaded whereby mechanical arm 47 will spring back to the arming position of device 40 whenever the rotation of mechanical arm 47 is less than 60°.

Mechanical arm 47 is conversely operated by a operator when switching device 40 from the disarming position to the arming position. A deflector 49 extending from casing 41 is intended to deflect inadvertent or accidental application of forces onto mechanical arm 47.

A LED display 45 embedded within casing 41 communicates various conditions of the squib controller 50 to an operator of device 40. When device 40 is disarmed and squib load SQ is being applied to controller 50, LED display 45 emits a steady amber light as an indication that squib controller 50 is detecting a resistance in squib load SQ. Thus, with an emission of the steady amber light, the operator of device 40 can ascertain that squib load SQ is operationally ready to be fired by squib firing current $I_{SF}$ (FIGS. 1–4).

When device 40 is armed and squib load SQ is not being applied to controller 50, LED display 45 emits a flashing green light as an indication that squib controller 50 is receiving primary voltage $V_{PS}$ and backup voltage $V_{BS}$ particularly above a minimum voltage level. Thus, an operator of device 40 can ascertain that squib controller 50 is operationally ready to sufficiently generate squib firing current $I_{SF}$ upon a subsequent application of squib load SQ to controller 50.

Squib Controller 50

Figure 7:
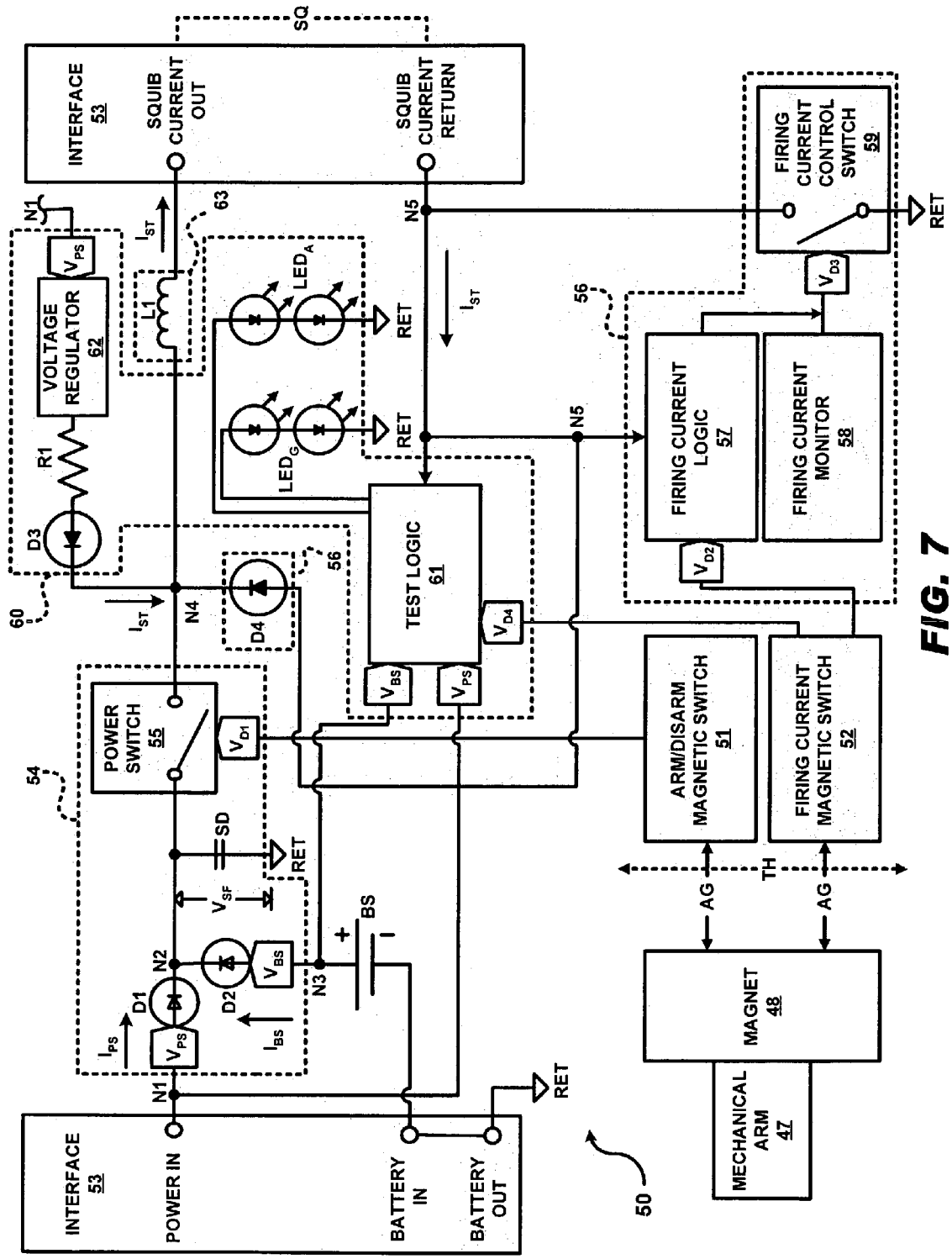
FIG. 7 illustrates one embodiment in accordance with the present invention of a squib controller operating in a disarmed mode.
Figure 8:
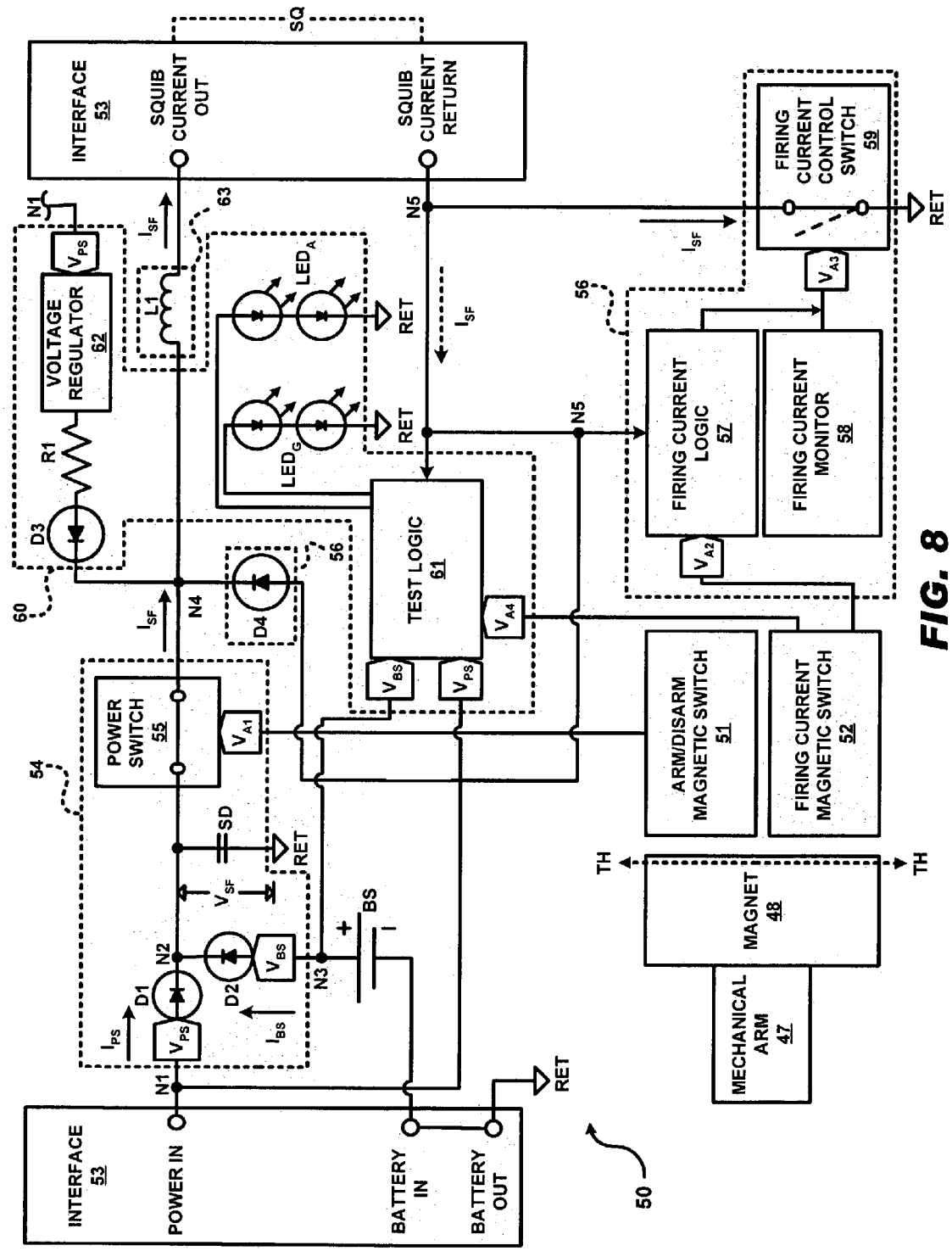
FIG. 8 illustrates the squib controller illustrated in FIG. 7 operating in an armed mode.

Squib controller 50 as illustrated FIGS. 7 and 8 employs an arm/disarm magnetic switch 51 (e.g., a Hall effect switch), a firing current magnetic switch 52 (e.g., a Hall effect switch), an interface 53, a power supply 54, a firing current regulator 56, an operational monitor 60, and an output filter 63. To facilitate an understanding of the illustrated configuration of squib controller 50, the following description of squib controller 50 is predicated on an electric connection of system power source 25 (FIGS. 1–4) to a POWER IN terminal of interface 53.

Power supply 54 employs a diode D1, a diode D2, a storage device SD of any type, and a power switch 55 of any type. Diode D1 is electrically connected to a node N1 and a node N2 whereby primary voltage $V_{PS}$ less a diode drop is applied to node N2. Diode D2 is electrically connected to node N2 and a node N3, and battery source BS is electrically connected to node N3 whereby backup voltage $V_{BS}$ from battery source BS less a diode drop is also applied to node N2. Battery source BS is also electrically connected to a common reference RET via an electrical connection of battery source BS to a BATTERY IN terminal of interface 53 and an electrical connection of a BATTERY OUT terminal of interface 53 to common reference RET.

As will be subsequently explained in more detail herein, storage device SD conditionally stores and discharges squib firing power for firing squib load SQ. In the illustrated embodiment, power supply 54 implements an analog OR of primary voltage $V_{PS}$ and backup voltage $V_{BS}$ to yield and store the squib firing power. Specifically, a voltage level of squib firing voltage $V_{SF}$ is established at node N2 as a function of the relative voltage levels of primary voltage $V_{PS}$ and backup voltage $V_{BS}$. As a result, when storing the squib firing power, storage device SD will selectively draw a primary current $I_{PS}$ and a backup current $I_{BS}$ from system power source 25 (FIGS. 1–4) and/or battery source BS, respectively, based on the relative voltage levels of primary voltage $V_{PS}$ and backup voltage $V_{BS}$.

Power switch 55 is electrically connected to node N2 and a node N4. Power switch 55 is also in electrical communication with magnetic switch 51 to perform two functions. First, power switch 55 is switched to an open state to electrically isolate node N3 from node N4 whenever magnetic switch 51 provides a disarming voltage $V_{D1}$ to power switch 55 as illustrated in FIG. 7. Second, power switch 55 is switched to a closed state to electrically couple node N2 to node N4 whenever magnetic switch 51 provides an arming voltage $V_{A1}$ to power switch 55 as illustrated in FIG. 8.

Output filter 63 includes an inductor L1 electrically connected to node N4 and SQUIB CURRENT OUT terminal of interface 53.

Firing current regulator 56 employs a firing current logic 57, a firing current monitor 58, a firing current control switch 59 and a diode D4. Firing current logic 57 and firing current control switch 59 are electrically connected to a node N5. Current control switch 59 is further electrically connected to common reference RET. Diode D4 is electrically connected to nodes N4 and N5.

Firing current logic 57 is in electrical communication with magnetic switch 52 to perform two functions. First, whenever magnetic switch 52 provides a disarming voltage $V_{D2}$ to firing current logic 57 as illustrated in FIG. 7, firing current logic 57 operates to provide a disarming voltage $V_{D3}$ to firing current control switch 59 whereby current control switch 59 is switched and maintained in an open state.

Second, whenever magnetic switch 52 provides an arming voltage $V_{A2}$ to firing current logic 57 as illustrated in FIG. 8, firing current logic 57 operates to provide an arming voltage $V_{A3}$ to firing current control switch 59 to initially close firing current control switch 59. Thereafter, firing current monitor 58 operates to switch firing current control switch 59 between the closed state and the open state as will be subsequently described herein.

Operational monitor 60 employs a voltage regulator 62, a resistor R1, and a diode D3 electrically connected in series between node N1 and node N4. Voltage regulator 62, resistor R1 and diode D3 are powered by primary voltage $V_{PS}$ to generate squib testing current $I_{ST}$ as illustrated in FIGS. 7 and 8 whenever squib load SQ is applied to controller 50.

Operational monitor 60 further employs a test logic 61, a green light display $LED_G$, and an amber light display $LED_A$. Test logic 61 is electrically connected to nodes N1, N3 and N5 as well as green light display $LED_G$ and amber light display $LED_A$. Test logic 61 is in electrical communication with firing current magnetic switch 52 to perform two functions.

First, whenever magnetic switch 52 provides a disarming voltage $V_{D4}$ to test logic 61 as illustrated in FIG. 7, test logic 61 operates amber light display $LED_A$ in a steady state in response to a sensing by test logic 61 of squib testing current $I_{ST}$ flowing through node N5 via the SQUIB CURRENT RETURN of interface 53.

Second, whenever magnetic switch 52 provides an arming voltage $V_{A4}$ to test logic 61 as illustrated in FIG. 8, test logic 61 operates green light display $LED_G$ in a flashing state in response to a sensing by test logic 61 of primary voltage $V_{PS}$ being applied to node N1 and backup voltage $V_{BS}$ being applied to node N3, particularly above a minimum voltage level.

In one embodiment, squib controller 50 operates as set forth in the following TABLE 5:

TABLE 5

| | Mode | | | |
|---|---|---|---|---|
| | Disarming Mode FIG. 7 | | Arming Mode FIG. 8 | |
| Controller 50 | No SQ | SQ | No SQ | SQ |
| Power Supply 54 | Charging Mode | | Priming Mode | Discharging Mode |
| Current Regulator 56 | Disabled | | Priming Mode | Current Regulating Mode |
| Operational Monitor 60 | Disabled | Load Testing Mode | | Power Testing Mode |

Squib Controller 50: Disarmed Mode

Squib controller 50 operates in a disarmed mode whenever an air gap AG between a magnet 48 and magnetic switches 51 and 52 is greater than a threshold TH as illustrated in FIG. 7. In one embodiment, threshold TH is calculated to prevent magnetic switches 51 and 52 from sensing a magnetic field generated by magnet 48. In a second embodiment, threshold TH can be calculated to facilitate a sensing by magnetic switches 51 and 52 of a particular strength range of the magnetic field (e.g., magnetic field $\leq 30$ G). Switch 51 outputs disarming voltage $V_{D1}$, and switch 52 outputs disarming voltages $V_{D2}$ and $V_{D4}$ as indications that air gap AG is greater than threshold TH.

In the disarmed mode, power switch 55 is switched to an open state via disarming voltage $V_{D1}$ whereby power supply 54 operates in a charging mode to store squib firing voltage $V_{SF}$ within storage device SD as an analog OR of primary voltage $V_{PS}$ and backup voltage $V_{BS}$. Firing current control switch 59 is switched to an open state via disarming voltages $V_{D2}$ and $V_{D3}$ whereby firing current regulator 56 is disabled.

Whenever squib load SQ is applied to controller 50 as exemplary illustrated in FIG. 7, operational monitor 60 operates in a load testing mode whereby inductor L1 controls a flow rate of squib testing current $I_{ST}$ as generated by voltage regulator 62 through squib load SQ. Squib testing current $I_{ST}$ is generated within an amperage range calculated to flow through squib load SQ without firing squib load SQ (e.g., squib testing current $I_{ST}$<50 milliamps). If test logic 61 senses a return of squib testing current $I_{ST}$ via node N5, test logic 61 operates amber light display $LED_A$ to emit a steady amber light as an indication of a detected resistance of squib load SQ.

Squib Controller 50: Armed Mode

Squib controller 50 operates in an armed mode whenever the air gap AG between magnet 48 and magnetic switches 51 and 52 is less than threshold TH as illustrated in FIG. 8. In one embodiment, threshold TH is calculated to facilitate a sensing by magnetic switches 51 and 52 of a particular strength range of the magnetic field (e.g., magnetic field >30 G). Switch 51 outputs arming voltage $V_{A1}$ and switch 52 outputs disarming voltages $V_{A2}$ and $V_{A4}$ as indications that air gap AG is less than a threshold TH.

Whenever squib load SQ is not being applied to controller 50, power supply 54 operates in a priming mode due to power switch 55 being switched to a closed state via arming voltage $V_{A1}$. In the priming mode, power supply 54 applies squib firing voltage $V_{SF}$ or a portion thereof to node N4, but squib firing current $I_{SF}$ is not being drawn from storage device SD. Also, firing logic 57 operates in priming mode via arming voltage $V_{A2}$ whereby current regulator 56 is prepared to switch to a current regulating mode upon a sensing of squib firing current $I_{SF}$ by firing logic 57.

Upon a subsequent application of squib load SQ to controller 50 as illustrated in FIG. 8, power supply 54 switches from the priming mode to a discharging mode whereby storage device SD discharges squib fire voltage $V_{FS}$ to generate a flow of squib firing current $I_{SF}$ via power switch 55 to node N4 within an amperage range calculated to flow through squib load SQ until squib load SQ is fired (e.g., squib firing current $I_{SF}$>5.5 amps for a time period greater than 50 milliseconds). To prevent a dudding of squib load SQ, firing current regulator 56 is switched from the priming mode to the current regulating mode whereby firing current control switch 59 is switched to a closed state via arming voltage $V_{A3}$.

Inductor L1 and firing current monitor 58 regulate an initial flow of squib firing current $I_{SF}$ from power switch 55 through node N4 and N5 to common reference RET via current control switch 59 until such time as squib firing current $I_{SF}$ approaches a current ceiling (e.g., squib firing current $I_{SF} \rightarrow 10.0$ amps) as sensed by firing current logic 57. Upon sensing squib firing current $I_{SF}$ approach to the current ceiling, firing current logic 57 directs firing current monitor 58 to re-open, partially or fully firing current control switch 59 whereby squib firing current $I_{SF}$ or a portion thereof is shunted to firing current logic 57. The result will be a decrease in squib firing current $I_{SF}$, which is sensed by firing current logic 57. Upon sensing squib firing current $I_{SF}$ approach a current floor (e.g., squib firing current $I_{SF} \rightarrow 5.5$ amps), firing current logic 57 directs firing current monitor 58 to re-close firing current control switch 59 whereby squib firing current $I_{SF}$ again flows to common reference RET via current control switch 59. The result again will be an increase in squib firing current $I_{SF}$. This current regulation of squib firing current $I_{SF}$ by firing current regulator 56 will occur until squib load SQ is fired. In one embodiment, the sensing of squib firing current $I_{SF}$ approaching a current ceiling or current floor is based on a sensing of squib firing current $I_{SF}$ crossing over a current threshold (e.g., 10 amps>current threshold>5.5 amps).

During a firing of squib load SQ, voltage regulator 62 continues to generate squib testing current $I_{ST}$. However, squib firing current $I_{SF}$>>squib testing current $I_{ST}$ whereby squib testing current $I_{ST}$ has no effect on the firing of squib load SQ.

Irrespective of whether squib load SQ is being applied to controller 50, operational monitor 60 operates in a power testing mode whereby green light display $LED_G$ emits a flashing green light if test logic 61 senses an application of primary voltage $V_{PS}$ to node N1 and an application of backup voltage $V_{BS}$ an node N3, particularly above a minimum voltage level.

Squib Controller 70

Figure 9:
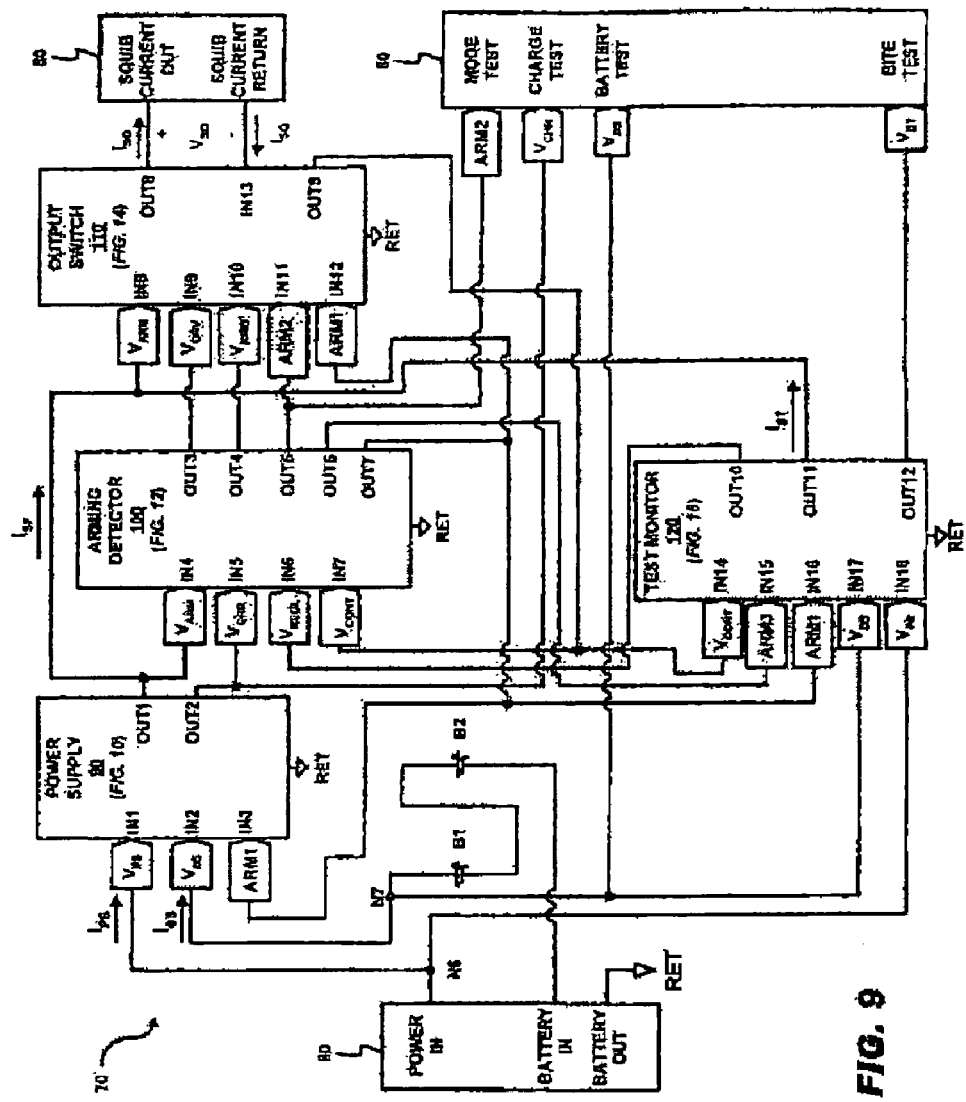
FIG. 9 illustrates one embodiment in accordance with the present invention of the squib controller illustrated in FIGS. 7 and 8.

The illustrated components of squib controller 50 can be composed of analog or digital electronic components, electronic circuits, hardware, software, firmware or any combination thereof. The illustrated components of squib controller 50 can also be assembled on one or more platforms. FIG. 9 illustrates a squib controller 70 as one embodiment of controller 50.

Referring to FIG. 9, squib controller 70 employs an interface 80, a power supply 90, an arming detector 100, an output switch 110, and a test monitor 120 on a printed circuit board.

An input IN1 of power supply 90 and an input IN18 of test monitor 120 are electrically connected via a node N6 and a POWER IN terminal of interface 80 to system power source 25 (FIGS. 1–4) to thereby receive primary voltage $V_{PS}$ (e.g., 18–32 volts) from system power source 25.

An input IN2 of power supply 90 and an input IN17 of test monitor 120 are electrically connected via a node N7 to battery source BS (FIGS. 7 and 8) in the form of a series connection of a battery B1 and a battery B2 (e.g., 9 volt alkaline batteries). Power supply 90 and test monitor 120 receive backup voltage $V_{BS}$ from batteries B1 and B2 via node N7 and the interface 80 receives the backup voltage $V_{BS}$ at a BATTERY TEST terminal.

An input IN4 of arming detector 100 and an input IN8 of output switch 110 are electrically connected to an output OUT1 of power supply 90 to receive arming voltage $V_{ARM}$ from power supply 90 during an armed mode as will be subsequently explained herein. An input IN4 of arming detector 100 and an input IN8 of output switch 110 are also electrically connected to an output OUT11 of test monitor 120 to receive arming voltage $V_{ARM}$ from test monitor 120 during a disarmed mode as will be subsequently explained herein.

An output OUT2 of power supply 90 is electrically connected to an input IN5 of arming detector 100 and a CHARGE TEST terminal of interface 80. Arming detector 100 receives a charging voltage $V_{CHR}$ from power supply 90. The CHARGE TEST terminal of interface 80 facilitates a monitoring of charging voltage $V_{CHR}$ by an operator of squib controller 70.

An input IN9 of output switch 110 is electrically connected to output OUT3 of arming detector 100 to receive a drive voltage $V_{DRV}$. An input IN10 of output switch 110 is electrically connected to output OUT4 of arming detector 100 to receive. regulating reference voltage $V_{RREF}$.

An input IN11 of output switch 110 and a MODE TEST terminal of interface 80 are electrically connected to an output OUT5 of arming detector 100 to thereby receive an arming signal ARM2. The MODE TEST terminal of interface 80 facilitates a monitoring of arming signal ARM2 by an operator of squib controller 70.

An input IN15 of test monitor 120 is electrically connected to an output OUT6 of arming detector 100 to thereby receive an arming signal ARM3.

An output OUT7 of arming detector 100 is electrically connected to an input IN3 of power supply 90, an input IN12 of output switch 110, and an input IN16 of test monitor 120. Power supply 90, output switch 110 and test monitor 120 receive an arming signal ARM1 from arming detector 100 via output OUT7.

An output OUT8 of output switch 110 is electrically connected to a SQUIB CURRENT OUT terminal of interface 80. An input IN13 of output switch 110 is electrically connected to a SQUIB CURRENT RETURN terminal of interface 80. Whenever squib load SQ is applied to output switch 110, output switch 110, establishes a squib voltage $V_{SQ}$ between output OUT8 and input INT13 whereby a squib current $I_{SQ}$ flows through squib load SQ.

An output OUT9 of output switch 110 is electrically connected to an input IN7 of arming detector 100 and to an input IN14 of test monitor 120. Arming detector 100 and test monitor 120 receive a continuity voltage $V_{CONT}$ from output switch 110 via output OUT9.

An output OUT 10 of test monitor 120 is electrically connected to an input IN6 of arming detector 100, which receives a regulated voltage $V_{REGL}$ from test monitor 120. An output OUT12 of test monitor 120 is electrically connected to a BITE TEST terminal of interface 80, which facilitates a monitoring of a bite voltage $V_{BT}$ by an operator of squib controller 70.

In operation, squib controller 70 is switched between a disarmed mode and an armed mode. To this end, arming detector 100 includes magnetic switches 51 and 52 (FIGS. 7 and 8) for performing an arming detection feature. In one embodiment, an arming detector 100 operates in accordance with the following TABLE 6:

TABLE 6

| Signal | Mode | |
| --- | --- | --- |
| | Disarmed | Armed |
| Arming Signal ARM1 | Logic Low | Logic High |
| Arming Signal ARM2 | Logic Low | Logic High |
| Arming Signal ARM3 | Logic High | Logic Low |

Arming detector 100 powers magnetic switch 51 via charging voltage $V_{CHR}$ whereby magnetic switch 51 generates arming signal ARM1 at a logic low whenever air gap AG between magnet 48 and magnetic switch 51 exceeds threshold TH as illustrated in FIG. 7. Conversely, magnetic switch 51 generates arming signal ARM1 at a logic high whenever air gap AG between magnet 48 and magnetic switch 51 is less than threshold TH as illustrated in FIG. 8.

Arming detector 100 powers magnetic switch 52 via regulated voltage $V_{REGL}$ whereby magnetic switch 52 generates output arming signal ARM2 at a logic low and arming signal ARM3 at a logic high whenever air gap AG between magnet 48 and magnetic switch 52 exceeds threshold TH as illustrated in FIG. 7. Conversely, magnetic switch 52 generates arming signal ARM2 at a logic high and arming signal ARM3 at a logic low whenever air gap AG between magnet 48 and magnetic switch 52 is less than threshold TH as illustrated in FIG. 8.

In one embodiment, based on arming signals ARM1–ARM3, controller 70 operates in accordance with the following TABLE 7:

TABLE 7

| | Mode | | | |
| --- | --- | --- | --- | --- |
| | Disarmed | | Armed | |
| Controller 70 | No SQ | SQ | No SQ | SQ |
| Power Supply 90 | Charging Mode | | Priming Mode | Discharging Mode |
| Firing Detection of Arming Detector 100 | Disabled | | Priming Mode | Firing Enabling Mode |
| Output Switch 110 | Disabled | Load Testing Mode | Disabled | Current Regulating Mode |
| Test Monitor 120 | Disabled | Load Testing Mode | | Power Testing Mode |

Power supply 90 continually outputs charging voltage $V_{CHR}$ within a charging voltage range for powering magnetic switch 51. Whenever arming signals ARM1 and ARM2 are a logic low to indicate a disarmed mode of controller 70, power supply 90 operates in a charging mode as listed in TABLE 7 for storing squib firing voltage $V_{SF}$ (FIGS. 7 and 8) as an analog OR of primary voltage $V_{PS}$ and backup voltage $V_{BS}$. In one embodiment, arming voltage $V_{ARM}$ is 0 volts as outputted by power supply 90 during the charging mode.

Whenever (1) arming signals ARM1 and ARM2 are a logic high to indicate an armed mode of controller 70 and (2) squib load SQ is not being applied to output switch 110, power supply 90 and a firing detection feature of arming detector 100 operate in a priming mode for preparing output switch 110 to fire upon a subsequent load of squib load SQ to output switch 110. In one embodiment, arming voltage $V_{ARM}$ equates squib firing voltage $V_{SF}$ (FIGS. 7 and 8) as outputted by power supply 90 during the priming mode. Upon a subsequent loading of squib load SQ to output switch 110, power supply 90 operates in a discharging mode to discharge squib firing voltage $V_{SF}$ whereby output switch 100 establishes and controls a flow rate of flow squib firing current $I_{SF}$ as squib current $I_{SQ}$ through squib load SQ via output OUT8 of output switch 110.

Upon sensing a return of squib firing current $I_{SF}$ via input IN13 of output switch 110, output switch 110 provides continuity voltage $V_{CONT}$ to arming detector 100 within a voltage range for indicating to arming detector 100 that squib firing current $I_{SF}$ is flowing through squib load SQ. In response thereto, the firing detection feature of arming detector 100 switches to a firing enabling mode whereby driving voltage $V_{DRV}$ is outputted by arming detector 100 to output switch 110 within a voltage range for switching output switch 110 to the current regulating mode. Regulating reference voltage $V_{RREF}$ is also outputted by arming detector 100 to output switch 110 within a voltage range for establishing a current crossover threshold for squib firing current $I_{SF}$ whereby output switch 110 regulates the flow of squib firing current $I_{SF}$ is flowing through squib load SQ until the squib load is fired.

Output switch 110 and test monitor 120 operate in a load testing mode as listed in TABLE 7 when controller 70 is disarmed and squib load SQ is being applied to output switch 110. In the load testing mode, test monitor 120 generates a squib testing current $I_{ST}$ and output switch 110 establishes a flow of squib testing current $I_{ST}$ as squib current $I_{SQ}$ through squib load SQ via output OUT8. Upon sensing a return of squib testing current $I_{ST}$ via input IN13 of output switch 110, output switch 110 provides continuity voltage $V_{CONT}$ to test monitor 120 within a voltage range for indicating to test monitor 120 that squib testing current $I_{ST}$ is flowing through squib load SQ, yet insufficient for activating the firing detection feature of arming detector 100. Test monitor 120 incorporates amber light display $LED_A$ (FIGS. 7 and 8) to emit a steady amber light upon receipt of continuity voltage $V_{CONT}$ within the proper voltage range.

Test monitor 120 operates in a power testing mode as listed in TABLE 7 when controller 70 is armed. Specifically, test monitor 120 senses primary voltage $V_{PS}$ being applied to node N6 and backup voltage $V_{BS}$ being applied to node N7. Test monitor 120 incorporates green light display $LED_G$ (FIGS. 7 and 8) to emit a flashing green light as an indication to an operator of controller 70 that both primary voltage $V_{PS}$ and backup voltage $V_{BS}$ are above a minimum voltage level. Output OUT12 of test monitor 120 can be used to ascertain a voltage level of backup voltage $V_{BS}$ whenever green light display $LED_G$ (FIGS. 7 and 8) fails to emit a flashing green light during the armed mode of controller 70.

Power supply 90, arming detector 100, output switch 110, and test monitor 120 can be composed of analog or digital electronic components, electronic circuits, hardware, software, firmware or any combination thereof. Power supply 90, arming detector 100, output switch 110, and test monitor 120 can also be assembled on one or more platforms. FIGS. 10, 12, 14 and 16 illustrate various embodiments of power supply 90, arming detector 100, output switch 110, and test monitor 120, respectively.

Power Supply 90

Figure 10:
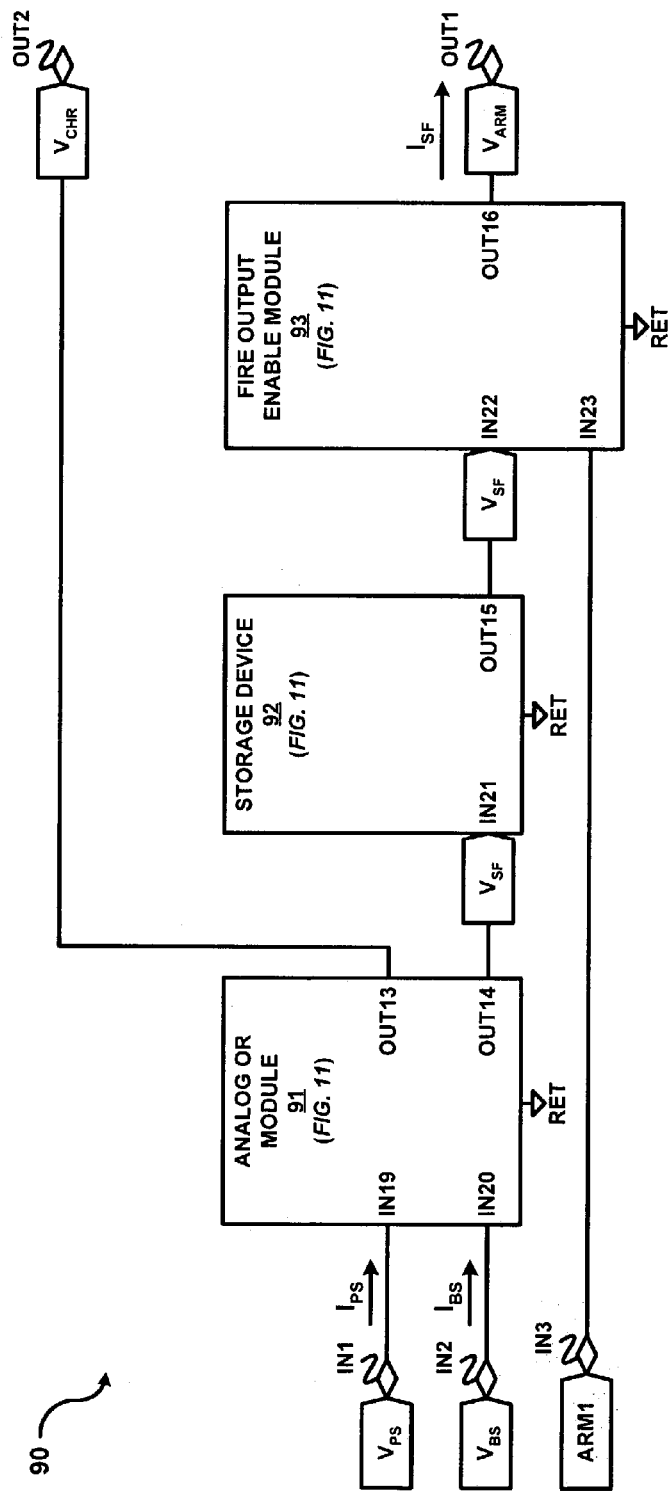
FIG. 10 illustrates one embodiment in accordance with the present invention of a power supply employed by the squib controller illustrated in FIG. 9.

FIG. 10 illustrates one embodiment of power supply 90 (FIG. 9). Power supply 90 employs an analog OR module 91, a storage device 92, and a fire output enable module 93.

Inputs IN19 and IN20 of analog OR module 91 are electrically connected to inputs IN1 and IN2 of power supply 90, respectively, to receive primary voltage $V_{PS}$ and backup voltage $V_{BS}$, respectively. Logic voltage module 91 includes circuitry for performing an analog OR operation on primary voltage $V_{PS}$ and backup voltage $V_{BS}$ to generate charging voltage $V_{CHR}$ and squib firing voltage $V_{SF}$. An output OUT13 of analog OR module 91 is electrically connected to output OUT2 to apply charging voltage $V_{CHR}$ to output OUT2.

An input IN21 of storage device 92 is electrically connected to an output OUT14 of analog OR module 91 to receive squib firing voltage $V_{SF}$. In one embodiment, storage device 92 includes one or more capacitors for storing and discharging squib firing voltage $V_{SF}$ in dependence of whether arming signal ARM1 is indicating the disarmed mode or the armed mode and whether squib load SQ is loaded on output switch 110.

To this end, an input IN23 of fire output enable module 93 is electrically connected to input IN3 of power supply 80 to receive arming signal ARM1, and an input IN22 of fire output enable module 93 is electrically connected to an output OUT15 of storage device 92 to receive squib firing voltage $V_{SF}$ or a portion thereof whenever arming signal ARM1 indicates an armed mode. An output OUT16 of fire output enable module 93 is electrically connected to output OUT1 of power supply 90. Fire output enable module 93 includes circuitry for generating arming voltage $V_{ARM}$ at the firing level, which is dependent upon a magnitude of squib firing voltage $V_{SF}$.

Figure 11:
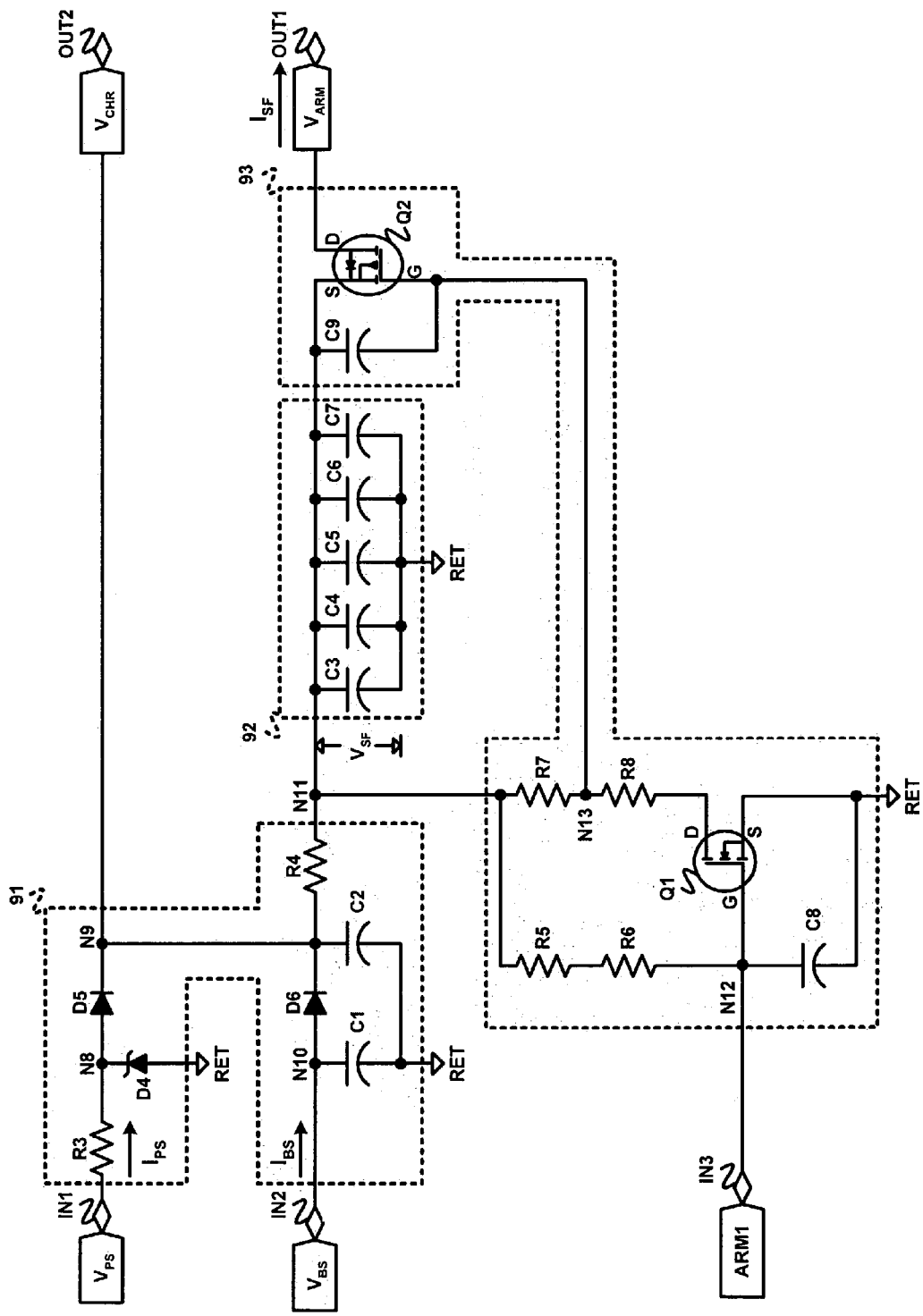
FIG. 11 illustrates one embodiment in accordance with the present invention of an analog OR module, a storage device, and a fire output enable module employed by the power supply illustrated in FIG. 10.

FIG. 11 illustrates one embodiment of analog OR module 91, storage device 92, and fire output enable module 93. Analog OR module 91 includes a resistor R3 (e.g., a 1 kΩ resistor), a resistor R4 (e.g., a 100 Ω resistor), a zener diode D4, a diode D5, a diode D6, a capacitor C1 (e.g., a 1 μF capacitor), and a capacitor C2 (e.g., a 1 μF capacitor).

Resistor R3 is electrically connected to input IN1 of power supply 90 and a node N8. Diode D4 is electrically connected to node N8 and common reference RET. Diode D5 is electrically connected to node N8 and a node N9. Diode D6 is electrically connected to node N9 and a node N10. Capacitor C1 is electrically connected to node N10 and common reference RET. Capacitor C2 is electrically connected to node N9 and common reference RET. Resistor R4 is electrically connected to node N9 and a node N11.

In operation, diode D4 clamps primary voltage $V_{PS}$ as applied to resistor R3 to limit primary current $I_{PS}$ as drawn from system power source 25 (FIGS. 1–4). Resistor R4 along with the internal resistance of batteries B1 and B2 (FIG. 9) limits backup current $I_{BS}$ from batteries B1 and B2. Capacitors C1 and C2 provide ESD protection for batteries B1 and B2. Diodes D5 and D6 perform a analog OR operation on clamped primary voltage $V_{PS}$ and backup voltage $V_{BS}$ whereby charging voltage $V_{CHR}$ is established at node N9. A voltage drop across resistor R4 establishes squib firing voltage $V_{SF}$ (FIGS. 7 and 8) at node N11.

Capacitor bank 92 includes five (5) capacitors C3–C7 (e.g., 6800 μF, 25 volts rated aluminum electrolytic capacitors). Each capacitor C3–C7 is electrically connected in parallel between node N11 and common reference RET. In view of primary voltage $V_{PS}$ being 25 volts and backup voltage $V_{BS}$ being 18 volts, capacitors C3–C7 store at least 5.0 joules of energy at 18 volts whenever arming signal ARM1 indicates a disarmed mode. When firing squib load SQ (FIG. 4), capacitors C3–C7 discharge down to approximately 10 volts with an efficiency to deliver at least 3.0 joules of power to switching apparatus 22 (FIG. 4), if present, and squib load SQ.

Fire output enable module 93 includes resistors R5–R8 (e.g., 1MΩ resistors), capacitors C8 and C9 (e.g., 0.15 μF capacitors), and a pair of p-channel E-MOSFETS. Resistors R5 and R6 are electrically connected in series between node N11 and a node N12. Resistor R7 is electrically connected to node N11 and node N13. Resistor R8 is electrically connected to node N13 and a drain terminal D of transistor Q1, which further has a gate terminal G electrically connected to node N12 and a source terminal electrically connected to common reference RET. Capacitor C8 is electrically connected to node N12 and common reference RET. Capacitor C9 is electrically connected to node N11 and a node N13. Transistor Q2 has a gate terminal G electrically coupled to node N13, a source terminal S electrically connected to node N11, and a drain terminal D electrically connected to output OUT1.

Based on arming signal ARM1, resistors R5–R8 and capacitors C8 and C9 operate to control and protect transistors Q1 and Q2 as set forth in the following TABLE 8:

TABLE 8

| | | Mode | |
|---|---|---|---|
| | | | Armed |
| Operation Variables | Disarmed | No SQ | SQ |
| Arming Signal ARM1 | Logic Low | | Logic High |
| Transistor Q1 | Off | | On |
| Transistor Q2 | Off | | On |
| Arming Voltage $V_{ARM}$ | 0 volts | Floating | ≈$V_{SF}$↓ |
| Squib Firing Current $I_{SF}$ | 0 amps | 0 amps | Regulated |

Arming Detector 100

Figure 12:
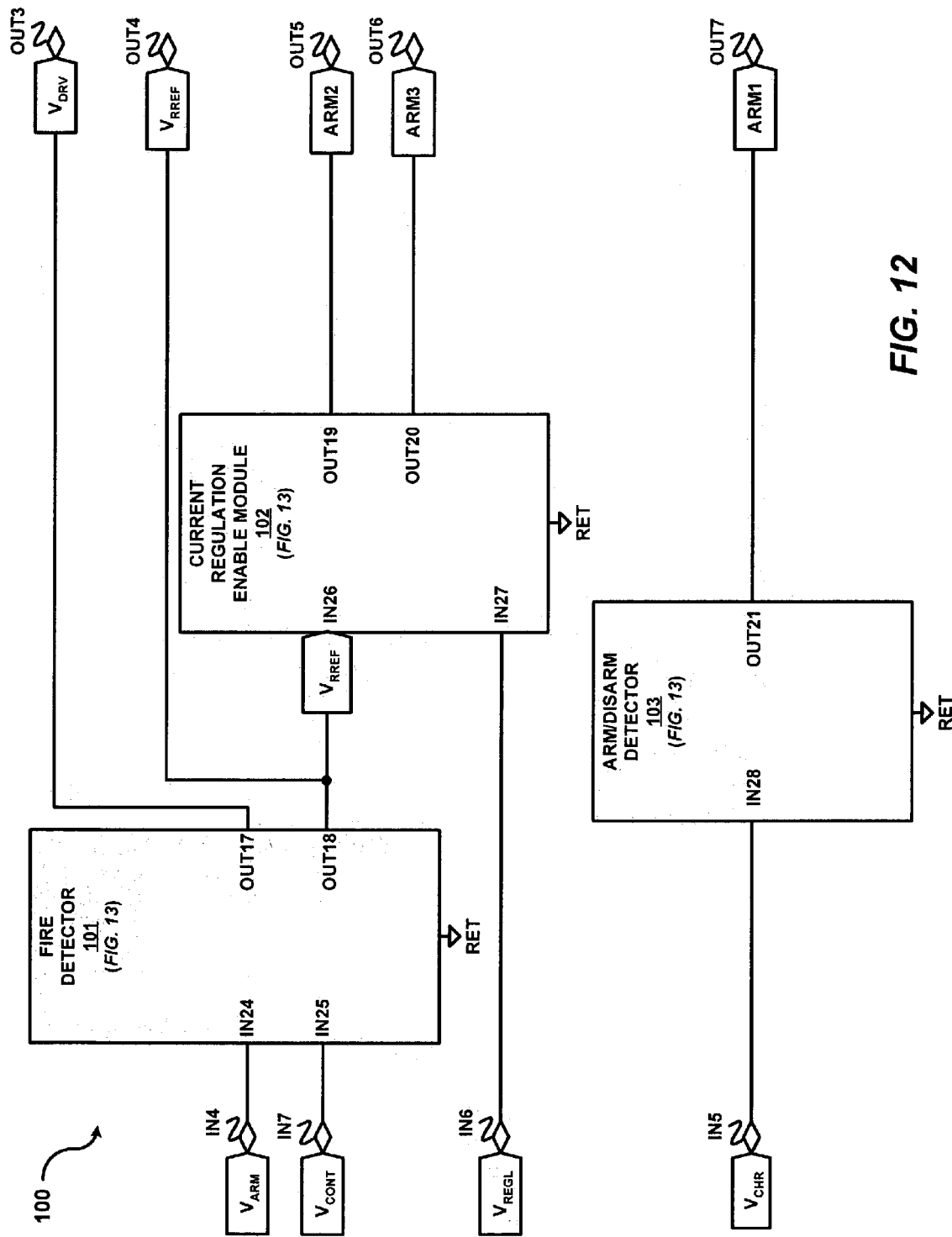
FIG. 12 illustrates one embodiment in accordance with the present invention of an arming detector employed by the squib controller illustrated in FIG. 9.

FIG. 12 illustrates one embodiment of arming detector 100 (FIG. 9) employing a fire detector 101, an output switch enable module 102, and an arm/disarm enable module 103.

An input IN24 of fire detector 101 is electrically connected to input IN4 of arming detector 100 to receive arming voltage $V_{ARM}$. An input IN25 of fire detector 101 is electrically connected to input IN7 of arming detector 100 to receive continuity voltage $V_{CONT}$. An output OUT17 of fire detector 101 is electrically connected to output OUT3 of arming detector 100 to apply driving voltage $V_{DRV}$ to output OUT3. An output OUT18 of fire detector 101 is electrically connected to output OUT4 of arming detector 100 to apply regulating reference voltage $V_{RREF}$ to output OUT4. Fire detector 101 includes circuitry, components, hardware (analog of digital), software, or any combination of thereof for generating driving voltage $V_{DRV}$ and regulating reference voltage $V_{RREF}$ as previously described herein.

An input IN26 of output switch enable module 102 is electrically connected to an output OUT18 of fire detector 101 to receive regulating reference voltage $V_{RREF}$. An input IN27 of output switch enable 102 is electrically connected to input IN6 of arming detector 100 to receive regulated voltage $V_{REGL}$. Output switch enable module 102 includes magnetic switch 51 (FIGS. 7 and 8), which is powered by regulating reference voltage $V_{RREF}$ and regulated voltage $V_{REGL}$, and additional circuitry for generating arming signals ARM2 and ARM3 in accordance with Table 6 and providing the arming signals ARM2 and ARM3 at outputs OUT19 and OUT20, respectively.

An input IN28 of arm/disarm enable module 103 is electrically connected to input IN5 of arming detector 100 to receive charging voltage $V_{CHR}$. Arm/disarm detector 103 includes magnetic switch 52, which is powered by charging voltage $V_{CHR}$, and additional circuitry for generating arming signal ARM1 in accordance with Table 6 and providing the arming signal ARM1 at an output OUT21 to the output OUT7.

Figure 13:
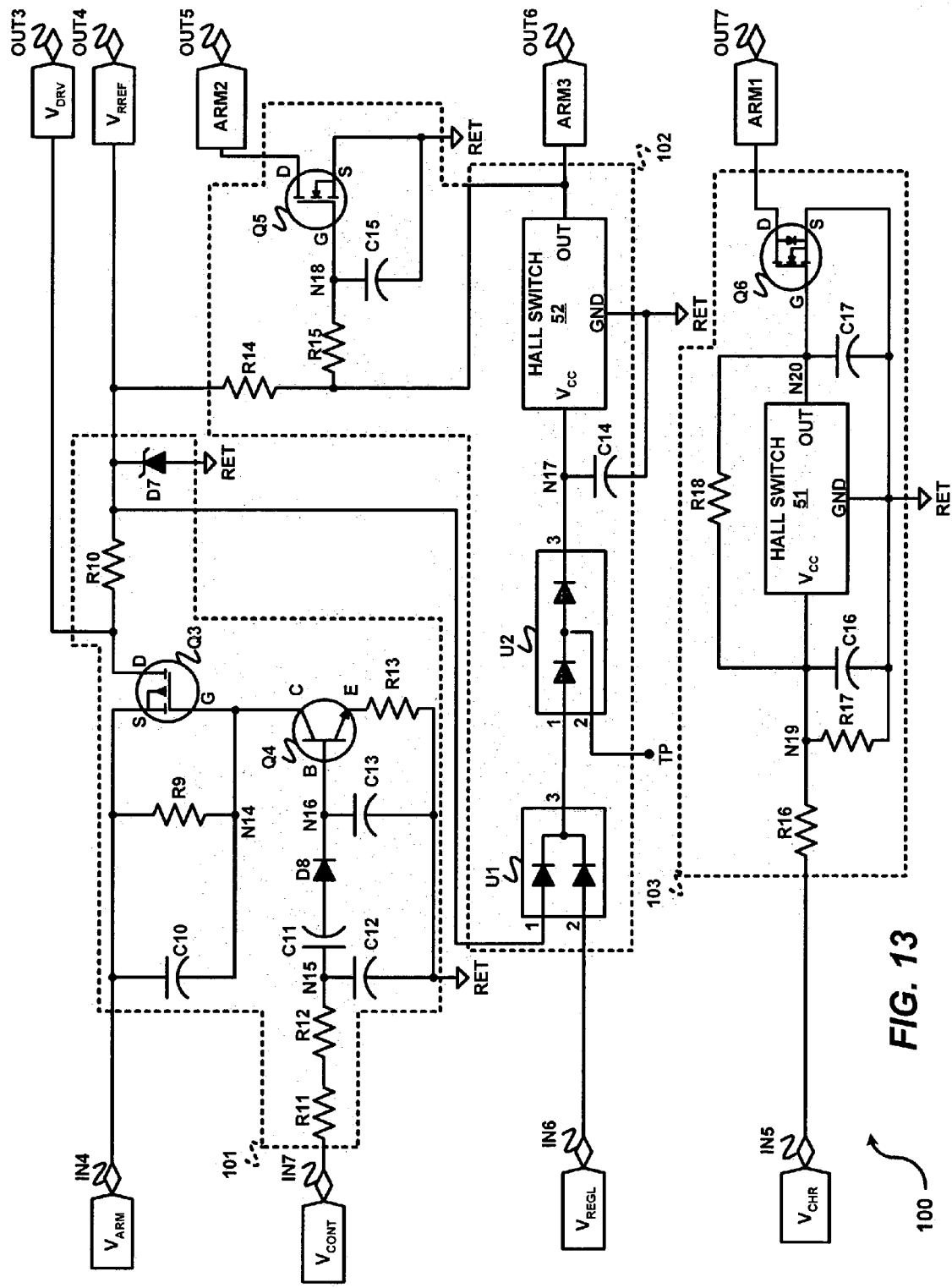
FIG. 13 illustrates one embodiment in accordance with the present invention of a fire detector, an output switch enable module, and an arm/disarm enable module employed by the arming detector illustrated in FIG. 12.

FIG. 13 illustrates one embodiment of fire detector 101, output enable switch module 102, and arm/disarm enable module 103.

Fire detector 101 includes a capacitor C10 (e.g., a 0.15 µF capacitor), a capacitor C11 (e.g., a 1.0 µF capacitor), a capacitor C12 (e.g., a 0.15 µF capacitor) a capacitor C13 (e.g., a 0.1 µF capacitor), a resistor R9 (e.g., a 49.9 KΩ resistor), a resistor R10 (e.g., a 2.67 KΩ resistor), a resistor R11 (e.g., a 4.99 KΩ resistor), a resistor R12 (e.g., a 4.99 kΩ resistor), a resistor R13 (e.g., a 4.99 kΩ resistor), a diode D8, a zener diode D7, an n-channel E-MOSFET Q3, and an npn bipolar transistor Q4.

Capacitor C10 and resistor R9 are electrically connected to input IN4 and a node N14. Transistor Q3 has a gate terminal G electrically connected to node N14, a source terminal S electrically connected to input IN4, and a drain terminal D electrically connected to output OUT3. Resistors R11 and R12 are electrically connected in series between input IN7 and a node N15. Capacitor C11 and a diode D8 are electrically connected in series to node N15 and a node N16. Capacitor C12 is electrically connected to node N15 and common reference RET. Capacitor C13 is electrically connected to node N16 and common reference RET.

Transistor Q4 has a base terminal B electrically connected to node N16, a collector terminal C electrically connected to node N14, and an emitter terminal E electrically connected to a resistor R13. Resistor R13 is also electrically connected to common reference RET. Resistor R10 is electrically connected to output OUT3 and output OUT4. Zener diode D7 is electrically connected to output OUT4 and common reference RET.

Based on arming voltage $V_{ARM}$ and continuity voltage $V_{CONT}$, resistors R9–R13, capacitors C10–C13 and diode D8 control and protect a switching On and Off of transistors Q3 and Q4 as set forth in the following TABLE 9:

TABLE 9

| | Mode | | | |
|---|---|---|---|---|
| | Disarmed | | Armed | |
| Operation Variables | No SQ | SQ | No SQ | SQ |
| Arming Voltage $V_{ARM}$ | | 0 volts | Floating | ≈$V_{SF}$ |
| Continuity Voltage $V_{CONT}$ | 0 volts | Load Testing Range | 0 volts | Firing Detection Range |
| Transistor Q3 | Off | Off | Off | On |
| Transistor Q4 | Off | Off | Off | On |
| Driving Voltage $V_{DRV}$ | 0 volts | 0 volts | 0 volts | ≈$V_{ARM}$ |
| Reference Voltage $V_{RREF}$ | 0 volts | 0 volts | 0 volts | Current Regulating Range |

Output switch enable module 102 includes a diode package U1, a diode package U2, a Hall effect switch 52 (e.g., an Allegro 3209 Hall Effect discrete switch), a capacitor C14 (e.g., a 1.0 µF capacitor), a capacitor C15 (e.g., a 0.027 µF capacitor), a resistor R14 (e.g., a 10 KΩ resistor), a resistor R15, and a p-channel E-MOSFET Q5.

Resistor R14 is electrically connected to output OUT4 and output OUT6. Resistor R15 is electrically connected to output OUT6 and a node N18. Transistor Q5 has a gate terminal G electrically connected to node N18, a source terminal S electrically connected to common reference RET, and a drain terminal D electrically connected to output OUT5. Capacitor C15 is electrically connected to node N18 and common reference RET. Diode package U1 has an input pin 1 electrically connected to output OUT4, an input pin 2 electrically connected to input IN6, and an output pin 3 electrically connected to an input pin 1 of diode package U2.

Diode package U2 further an input pin 2 electrically connected to a test point TP, and an output pin 3 electrically connected to a node N17. Hall effect switch 52 has a input pin $V_{CC}$ electrically connected to node N17, an output pin OUT electrically connected to output OUT6, and a ground pin GND electrically connected to common reference RET. Capacitor C14 is electrically connected to node N17 and common reference RET.

Based on regulating reference voltage $V_{RREF}$ and regulated voltage $V_{REGL}$, resistors R14 and R15, capacitors C14 and C15, and diode packages U1 and U2 control an operation of switch 52 and transistor Q5 as set forth in the following TABLE 10:

TABLE 10

| | Mode | |
|---|---|---|
| Operational Variables | Disarmed | Armed |
| OUT Pin of Switch 52 | 0 volts | Floating |
| Arming Signal ARM3 | Floating | 0 volts |
| Transistor Q5 | On | Off |
| Arming Signal ARM2 | 0 volts | Floating |

When air gap AG between switch 52 and magnet 48 is greater than threshold TH as illustrated in FIG. 7, Hall effect switch 52 is turned off, which turns on transistor Q5. When air gap AG between switch 52 and magnet 48 is less than threshold TH as illustrated in FIG. 8, Hall effect switch 52 is turned on, which turns off transistor Q5.

Arm/disarm enable module 103 includes a capacitor C16 (e.g., a 1.0 µF capacitor), a capacitor C17 (e.g., a 0.15 µF capacitor), a resistor R16 (e.g., a 499 KΩ resistor), a resistor R17 (e.g., a 140 Ω) resistor), a resistor R18 (e.g., a 1 MΩ resistor), a Hall effect switch 51 (e.g., an Allegro 3210 Hall Effect discrete switch), and a p-channel E-MOSFET Q6.

Resistor R16 is electrically connected to input IN5 and a node N19. Resistor R17 and capacitor C16 are electrically connected to node N19 and common reference RET. Resistor R18 is electrically connected to node N19 and a node N20. Hall effect switch 51 has an input pin $V_{cc}$ electrically connected to node N19, an output pin OUT electrically connected to node N20, and a ground pin GND electrically connected to common reference RET. Capacitor C17 is electrically connected to node N20 and common reference RET. Transistor Q6 has a gate terminal G electrically connected to node N20, a source terminal S electrically connected to common reference RET, and a drain terminal D electrically connected to output OUT7.

Arm/disarm enable 103 operates as set forth in the following TABLE 11:

TABLE 11

| | Mode | |
|---|---|---|
| Variables | Disarmed | Armed |
| OUT Pin of Switch 51 | 0 volts | Floating |
| Transistor Q6 | On | Off |
| Arming Signal ARM1 | 0 volts | Floating |

When air gap AG between switch 51 and magnet 48 is greater than threshold TH as illustrated in FIG. 7, Hall effect switch 51 is turned off, which turns on transistor Q6. When air gap AG between switch 51 and magnet 48 is less than threshold TH as illustrated in FIG. 8, Hall effect switch 51 is turned on, which turns off transistor Q6.

Output Switch 110

Figure 14:
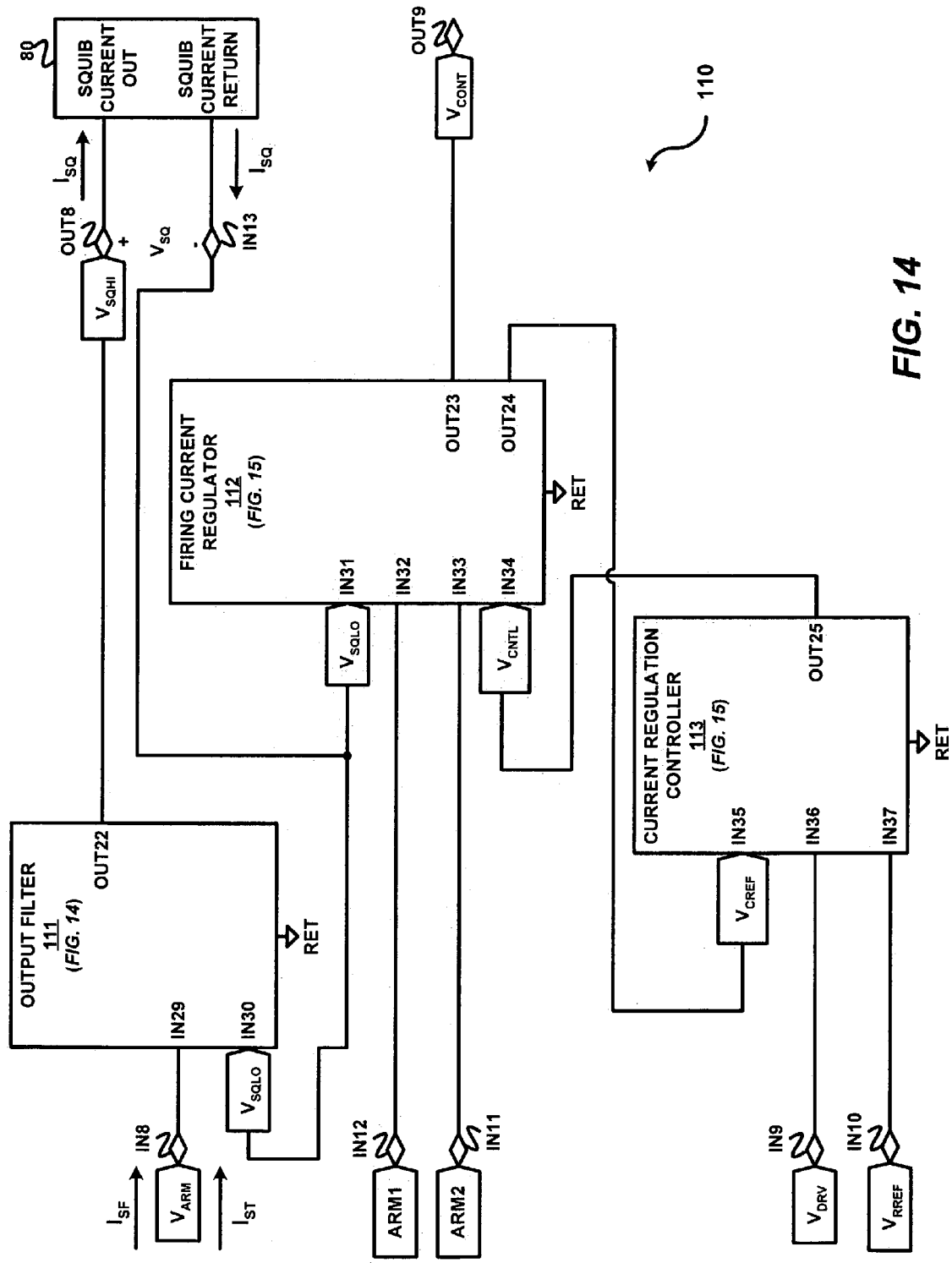
FIG. 14 illustrates one embodiment in accordance with the present invention of an output switch employed by the squib controller illustrated in FIG. 9.

FIG. 14 illustrates one embodiment of output switch 110 (FIG. 9) employing an output filter 111, a squib firing current enable module 112 and a squib firing current regulator 113.

An input IN29 of output filter is electrically connected to an input IN8 of output switch 110 to receive arming voltage $V_{ARM}$. An input IN30 of output filter is electrically connected to input IN13 to receive a squib voltage $V_{SQLO}$ being applied to input IN13. An output OUT22 of output filter 111 is electrically connected to output OUT8 of output switch 110 to apply a squib voltage $V_{SQHI}$ to output OUT8. Output filter 111 includes circuitry for controlling a flow rate of squib testing current $I_{ST}$ whenever output switch 110 establishes a flow of squib testing current $I_{ST}$ as squib current $I_{SQ}$ through squib load SQ, and for controlling a flow rate of squib firing current $I_{SF}$ whenever output switch 110 establishes a flow of squib firing current $I_{SF}$ as squib current $I_{SQ}$ through squib load SQ.

An input IN36 of current regulation controller 113 is electrically connected to input IN9 of output switch 110 to receive driving voltage $V_{DRV}$. An input IN37 of current regulation controller 113 is electrically connected to input IN10 of output switch 110 to receive regulating reference voltage $V_{RREF}$. An input IN35 of current regulation controller 113 is electrically connected to an output OUT24 of squib fire current enable module 112 to receive a current control reference voltage $V_{CREF}$. Current regulation controller 113 includes circuitry powered by driving voltage $V_{DRV}$ to generate a current control voltage $V_{CNTL}$ based on a comparison of regulating reference voltage $V_{RREF}$ and current control reference voltage $V_{CREF}$.

An input IN31 of firing current regulator 112 is electrically connected to input IN13 to receive squib low voltage $V_{SQLO}$ being applied to input IN13. An input IN32 of firing current regulator 112 is electrically connected to input IN12 of output switch 110 to receive arming signal ARM1. An input IN33 of squib fire current enable module 112 is electrically connected to input IN11 of output switch 110 to receive arming signal ARM2. An input IN34 of squib fire current enable 112 is electrically connected to output OUT25 of current regulation controller 113 to receive current control voltage $V_{CNTL}$. An output OUT23 of squib fire current enable 112 is electrically connected to output OUT9 of output switch 110 to apply continuity voltage $V_{CONT}$ to output OUT9. Firing current regulator 112 includes circuitry for regulating squib firing current $I_{SF}$ as previously described herein based on a current crossover threshold represented by control voltage $V_{CNTL}$.

When operating in the disarmed mode, output switch 111 controls squib current $I_{SQ}$ and squib voltage $V_{SQ}$ as squib testing current $I_{ST}$ and squib testing voltage $V_{ST}$, respectively, whenever squib load SQ (FIG. 3) is electrically coupled between SQUIB FIRE OUT terminal and SQUIB FIRE RETURN terminal of interface 80. Output filter 111 controls a flow rate of squib testing current $I_{ST}$, which is not regulated by firing current regulator 112 and squib current regulation controller 113.

When operating in the armed mode, output switch 110 controls squib current $I_{SQ}$ and squib voltage $V_{SQ}$ as squib firing current $I_{SF}$ and squib firing voltage $V_{SF}$, respectively, whenever squib load SQ (FIG. 3) is electrically coupled between SQUIB FIRE OUT terminal and SQUIB FIRE RETURN terminal of interface 80. Output filter 111 controls a flow rate of squib firing current $I_{SF}$, which is being regulated by firing current regulator 112 and squib current regulation controller 113.

Figure 15:
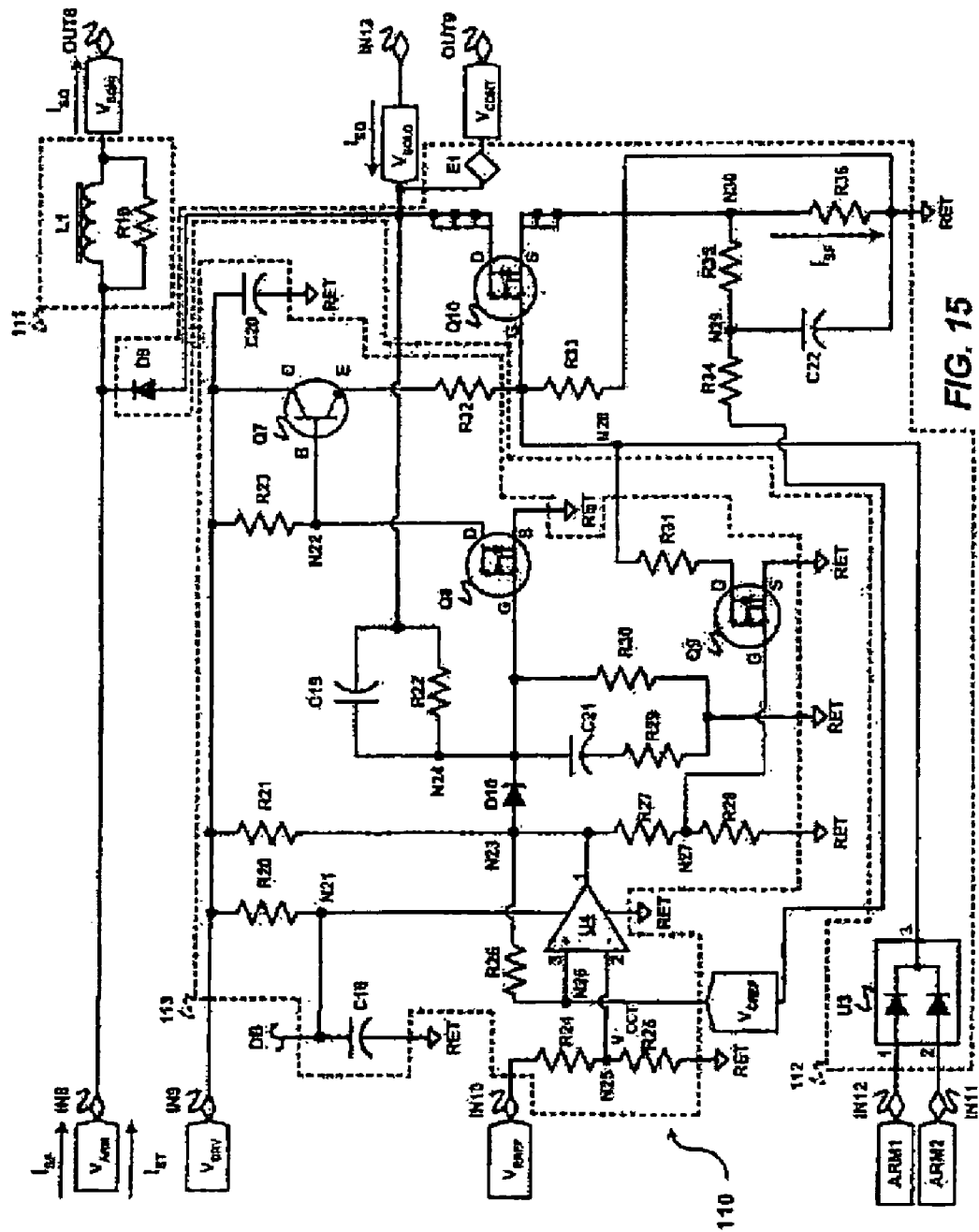
FIG. 15 illustrates a second embodiment in accordance with the present invention of an output filter, a squib firing current enable module, and a firing current regulator employed by the output switch illustrated in FIG. 14.

FIG. 15 illustrates one hardware embodiment of output switch 110. Output filter 111 includes an inductor L1 (e.g., a 74 µH inductor) and a resistor R19 (e.g., 1 KΩ resistor) which are electrically connected in parallel to input IN8 and output OUT8 of output switch 110.

Current regulation controller 113 includes a resistor R20 (e.g., a 499Ω resistor), a resistor R21 (e.g., a 1KΩ resistor), a resistor R22 (e.g., a 499 KΩ resistor), a resistor R23 (e.g., a 1 kΩ resistor), a resistor R24 (e.g., a 49.9Ω resistor), a resistor R25 (e.g., a 3.01 KΩ resistor), a resistor R26 (e.g., a 499 KΩ resistor), a resistor R27 (e.g., a 499Ω resistor), a resistor R28 (e.g., a 499Ω resistor), a resistor R29 (e.g., a 100Ω resistor), a resistor R30 (e.g., a 4.02 KΩ resistor), a resistor R31 (e.g., a 33.2Ω resistor), and a resistor R32. Current regulation controller 113 further includes a capacitor C18 (e.g., a 0.01 µF capacitor), a capacitor C19 (e.g., a 47 pF capacitor), a capacitor C20 (e.g., a 1.0 µF capacitor), a capacitor C21 (e.g., a 47 pF capacitor), and a diode D10. Current regulation controller 113 also includes a comparator U4, an npn bipolar transistor Q7 and a pair of p-channel E-MOSFETs Q8 and Q9.

Resistor R20 is electrically connected to input IN9 of output switch 110 and a node N21. Resistor 21 is electrically connected to input IN9 of output switch 110 and a node N23. Resistor 23 is electrically connected to input IN9 of output switch 110 and a node N22. Capacitor C20 is electrically connected to input IN9 of output switch 110 and common reference RET. Capacitor C18 is electrically connected to an external drive bias DB and common reference RET.

Resistor 24 is electrically connected to input IN10 of output switch 110 and a node N25. Resistor 25 is electrically connected to node N25 and common reference RET. Comparator U4 has a non-inverting input pin 3 electrically connected to a node N26, an inverting input pin 2 electrically connected to node N25, and an output pin 1 electrically connected to node N23. Resistor R26 is electrically connected to node N23 and node N26. Diode D10 is electrically connected to node N23 and node N24. Capacitor C19 and resistor 22 are electrically connected in parallel to node N24 and input IN13.

Transistor Q7 has a base terminal B electrically connected to node N22, a collector terminal electrically connected to input IN9, and an emitter terminal electrically connected to a resistor R32. Resistors R32 also is electrically connected to a node N28. Transistor Q8 has a gate terminal G electrically connected to node N24, a drain terminal D electrically connected to node N22, and a source terminal S electrically connected to common reference RET. Capacitor C21 and a resistor R29 are electrically connected in series to node N24 and common reference RET. Resistor R30 is electrically connected to node N24 and common reference RET.

Resistor R27 is electrically connected to node N23 and a node N27. Resistor R28 is electrically connected to node N27 and common reference RET. Transistor Q9 has a gate terminal G electrically connected to node N27, a drain terminal D electrically connected to a resistor R31, and a source terminal S electrically connected to common reference RET. Resistor R31 is also electrically connected to node N28.

Firing current regulator 112 includes a diode D9, a resistor R33 (e.g., a 1 KΩ resistor), a resistor R34 (e.g., a 1 KΩ resistor), a resistor R35 (e.g., a 2 KΩ resistor), a resistor R36 (e.g., a 0.5 Ω resistor), a capacitor C22 (e.g., a 1000 pF capacitor), a diode package U3, a ferrite bead E1, and a p-channel E-MOSFETs Q10.

Diode package U3 has an input pin 1 electrically connected to input IN12 of output switch 110, an input pin 2 electrically connected to input IN11 of output switch 110, and an output pin 3 electrically connected to node N28. Transistor Q10 has a gate terminal G electrically connected to node N28, a drain terminal D electrically connected to input IN13, and a source terminal S electrically connected to a node N30. Diode D9 is electrically connected to input IN8 and input IN13. Ferrite bead E1 is electrically connected to input IN13 and output OUT9 of output switch 110. Resistor R33 is electrically connected to node N28 and common reference RET. Resistor R34 is electrically connected to node N26 and a node N29. Resistor R35 is electrically connected to node N29 and node N30. Capacitor C22 is electrically connected to node N29 and common reference RET. Resistor R36 is electrically connected to node N30 and common reference RET.

Resistor R24 and resistor R25 divide regulating voltage reference $V_{RREF}$ to yield a current crossover threshold voltage $V_{CCT}$ at node N25. Based on arming voltage $V_{ARM}$, driving voltage $V_{DRV}$, regulating reference voltage $V_{RREF}$, current control reference voltage $V_{CREF}$, arming signal ARM1 and arming signal ARM2 as well as current crossover threshold voltage $V_{CCT}$, resistors R20–R36, capacitors C18–C22, diodes D9 and D10, and diode package U3 control and protect a switching of transistors Q7–Q10 as set forth in the following Table 12:

Prior to an application of squib load SQ on output switch 110 during the armed mode, transistor Q10 is turned off (i.e., transistor Q10 is inactive or in a lower end of a linear region), current crossover threshold voltage $V_{CCT}$ at node N25 is 0 volts, and current control reference voltage $V_{CREF}$ at node N26 is 0 volts. Upon an application of squib load SQ on output switch 110 during the armed mode, squib firing current $I_{SF}$ flows out of output aura and returns at input IN13. Continuity voltage $V_{CONT}$ starts to increase to activate controller 113 via driving voltage $V_{DRV}$, which in turn turns on transistor Q10 (i.e., transistor Q10 is saturated or in an upper end of a linear region) due to current crossover threshold voltage $V_{CCT}$ (i.e., a division of regulating reference voltage $V_{RREF}$) being greater than current control reference voltage $V_{CREF}$ (0 volts). As a result, squib firing current $I_{SF}$ will flow through transistor Q10 and resistor R36 to common reference RET, and current control reference voltage $V_{CREF}$ will increase to a point where current control reference voltage $V_{CREF}$ is greater than current crossover threshold voltage $V_{CCT}$. At this time, transistor Q10 again turns off to shunt a significant portion of, if not all, squib firing current $I_{SF}$ through resistors R22 and R30 to common reference RET. Current control reference voltage $V_{CREF}$ will therefore decrease to a point where current crossover threshold voltage $V_{CCT}$ is again greater than current control reference voltage $V_{CREF}$ and this process repeats itself until squib load SQ is fired. The overall result is a regulation of squib firing current $I_{SF}$ that applies a current limit upon squib firing current $I_{SF}$

Test Monitor 120

Figure 16:
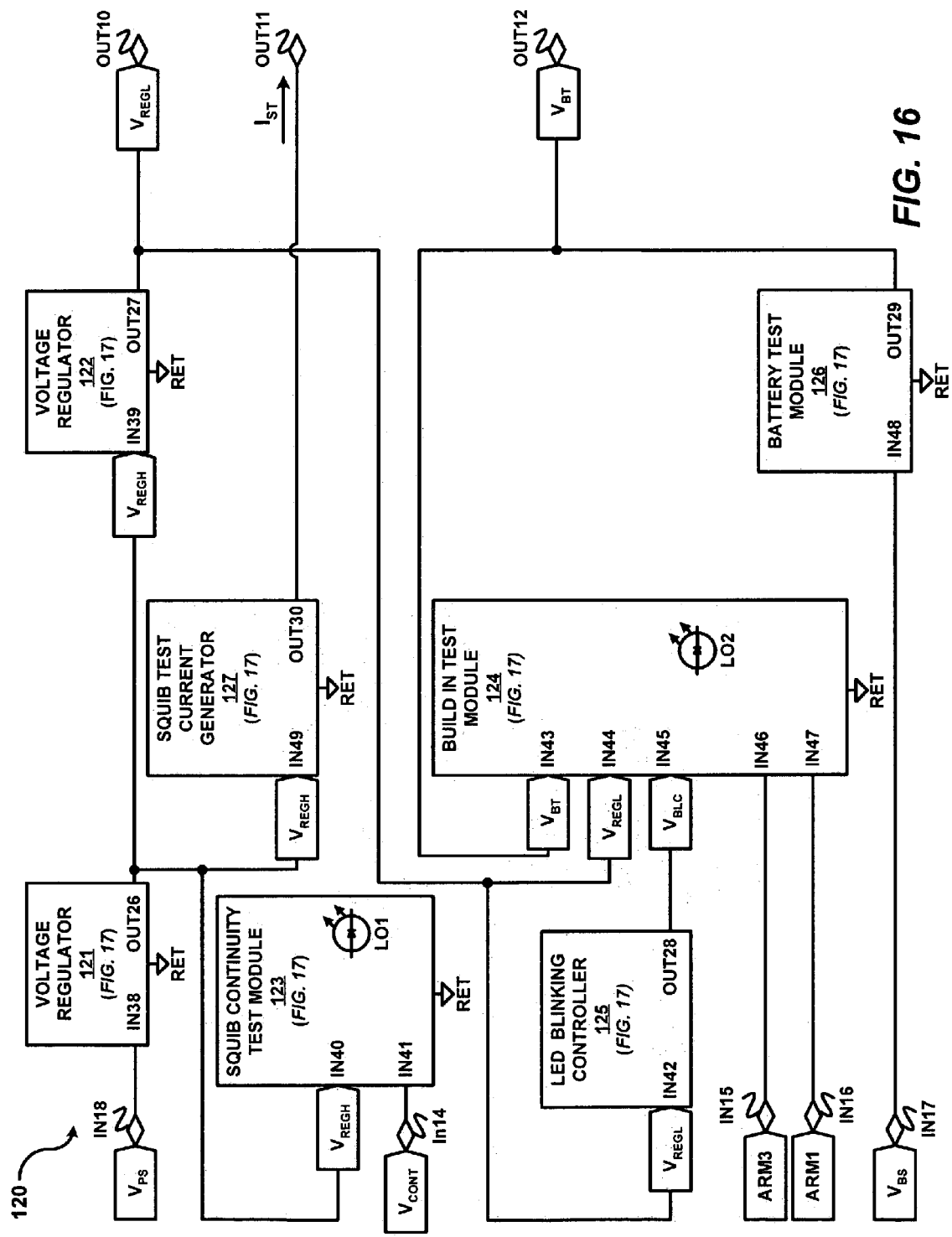
FIG. 16 illustrates one embodiment in accordance with the present invention of a test monitor employed by the squib controller illustrated in FIG. 9.

FIG. 16 illustrates one embodiment of test monitor 120 (FIG. 9) employing a voltage regulator 121, a voltage regulator 122, a squib continuity test module 123, a build in test module 124, a LED blinking control 125, and a battery test module 126.

An input IN38 of voltage regulator 121 is electrically connected to input IN18 of test monitor 120. Voltage regulator 121 includes circuitry for generating a regulated voltage $V_{REGH}$ (e.g., 15 volts) from primary voltage $V_{PS}$ (e.g., 18–32 volts).

TABLE 12

| | | Mode | | |
| --- | --- | --- | --- | --- |
| | | | Armed | |
| | Disarmed | | SQ | |
| Operation Variables | No SQ | SQ | No SQ | $V_{CCT} > V_{CREF}$ | $V_{CREF} > V_{CCT}$ |
| Arming Voltage $V_{ARM}$ | | 0 volts | Floating | ≈$V_{SF}$ |
| Driving Voltage $V_{DRV}$ | | 0 volts | 0 volts | ≈$V_{ARM}$ |
| Reference Voltage $V_{RREF}$ | | 0 volts | 0 volts | Current Regulating Range |
| Continuity Voltage $V_{CONT}$ | 0 volts | Load Testing Range | 0 volts | Firing Detection Range |
| Arming Signal A1 | | 0 volts | | Floating |
| Arming Signal A2 | | 0 volts | | Floating |
| Transistor Q7 | Off | Off | On | Off |
| Transistor Q8 | Off | Off | Off | On |
| Transistor Q9 | Off | Off | Off | On |
| Transistor Q10 | Off | Off | On | Off |
| Squib Current $I_{SQ}$ | | 0 amps | $I_{ST}$ | 0 amps | $I_{SF}$ |

An input IN39 of voltage regulator 122 is electrically connected to output OUT26 of voltage regulator 121 to receive regulated voltage $V_{REGH}$. Voltage regulator 122 includes circuitry for generating regulated voltage $V_{REGL}$ (e.g., 5 volts) from regulated voltage $V_{REGH}$.

An input IN40 of squib continuity test module 123 is electrically connected to output OUT26 of voltage regulator 121 to receive regulated voltage $V_{REGH}$. An input IN41 of squib continuity test module 123 is electrically connected to input IN14 of test monitor 120 to receive continuity voltage $V_{CONT}$. Squib continuity test module 123 includes circuitry powered by regulated voltage $V_{REGH}$ for operating amber light display $LED_A$ (FIGS. 7 and 8) to emit a steady amber light output LO1 whenever continuity voltage $V_{CONT}$ is within the load testing range.

An input IN45 of build in test module 124 is electrically connected to an output OUT28 of LED blinking control 125 to receive blinking control voltage $V_{BLC}$. An input IN46 of build in test module 124 is electrically connected to input IN15 of test monitor 120 to receive arming signal ARM3. An input IN47 of build in test module 124 is electrically connected to input IN16 of test monitor 120 to receive arming signal ARM1. An input IN43 of build in test module 124 is electrically connected to an output OUT29 of battery test module 126 to receive battery test voltage $V_{ST}$. An input IN44 of build in test module 124 is electrically connected to output OUT27 of voltage regulator 122 to receive regulated voltage $V_{REGL}$. Build in test module 124 and LED blinking control 125 include circuitry powered by regulating voltage $V_{REGL}$ for operating green light display $LED_G$ (FIGS. 7 and 8) to conditionally emit a flashing green light output LO2 during the armed mode whenever primary voltage $V_{PS}$ and backup voltage $V_{BS}$ are above a minimum threshold voltage.

An input IN48 of battery test module 126 is electrically connected to an input IN17 of test monitor 120 to receive backup voltage $V_{BS}$. An output OUT29 of battery test module 126 is electrically connected to output OUT12 of test monitor 120. Battery test module 126 includes circuitry for outputting a battery test voltage $V_{BT}$ as an indication of a voltage level of backup voltage $V_{BS}$.

Figure 17:
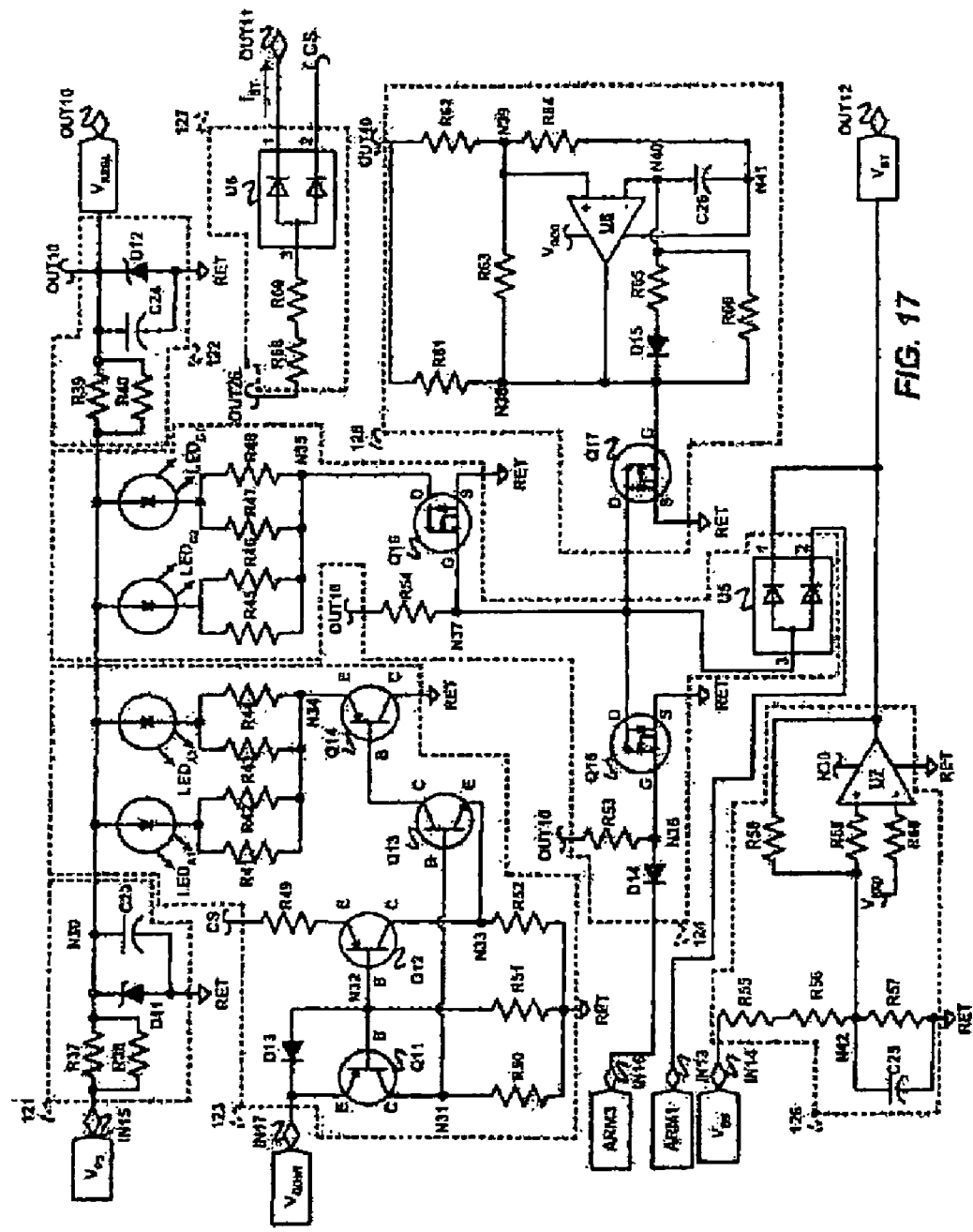
FIG. 17 illustrates one embodiment in accordance with the present invention of a pair of voltage regulators, a squib continuity test module, a build in test module, a LED blinking controller, and battery test module employed by the test monitor illustrated in FIG. 16.

FIG. 17 illustrates one hardware embodiment of test monitor 120. Voltage regulator 121 includes a resistor R37 (e.g., a 422Ω resistor), a resistor R38 (e.g., a 1 KΩ resistor), a zener diode D11, and a capacitor C23 (e.g., a 1 μF capacitor). Resistors R37 and R38 are electrically connected in parallel to input IN15 and a node N30. Diode D11 and capacitor C23 are electrically connected in parallel to node N30 and common reference RET. Diode D11 operates to clamp regulated voltage $V_{REGH}$, which is based on a voltage drop of primary voltage $V_{PS}$ across resistors R37 and R38.

Voltage regulator 122 includes a resistor R39 (e.g., a 1.5 KΩ resistor), a resistor R40 (e.g., a 1.5 KΩ resistor), a zener diode D12, and a capacitor C24 (e.g., a 1 μF capacitor). Resistors R39 and R40 are electrically connected in parallel to node N30 and output OUT10. Diode D12 and capacitor C24 are electrically connected in parallel to output OUT10 and common reference RET. Diode D12 operates to clamp regulated voltage $V_{REGL}$, which is based on a voltage drop of regulated voltage $V_{REGH}$ across resistors R39 and R40.

Squib continuity test module 123 includes amber $LED_{A1}$, amber $LED_{A2}$, resistors R41–R44 (e.g., 2 KΩ resistors), a diode D13, a resistor R49, a resistor R50 (e.g., a 392Ω resistor), a resistor R51 (e.g., a 49.9 KΩ resistor), a resistor R52 (e.g., a 392Ω resistor), an npn bipolar transistor Q13, and three pnp bipolar transistors Q11, Q12 and Q14. Diode D13 is electrically connected to input IN17 and a node N32. Transistor Q11 has a base terminal B electrically connected to node N32, an emitter terminal E electrically connected to input IN17, and a collector terminal electrically connected to a node N31. Resistor R49 is electrically connected to a current source CS. Transistor Q12 has a base terminal B electrically connected to node N32, an emitter terminal E electrically connected to resistor R49, and a collector terminal electrically connected to a node N33.

Resistor R50 is electrically connected to node N31 and common reference RET. Resistor R51 is electrically connected to node N32 and common reference RET. Resistor R52 is electrically connected to node N33 and common reference RET. Transistor Q13 has a base terminal B electrically connected to node N31, an emitter terminal E electrically connected to node N33, and a collector terminal C electrically connected to a base terminal of transistor Q14. Transistor Q14 also has an emitter terminal E electrically connected to node N34, and a collector terminal C electrically connected to a common reference RET.

Resistor R41 and resistor R42 are electrically connected in parallel between amber display $LED_A$ and node N34. Resistor R43 and resistor R44 are electrically connected in parallel between an amber display $LED_{A2}$ and node N34. Amber displays $LED_{A1}$ and $LED_{A2}$ are also electrically connected to node N30.

Squib test current generator 127 includes a resistor R68 (e.g., a 422Ω resistor), a resistor R69 (e.g., a 422Ω resistor), and a diode package U6. Resistors R68 and R69 are electrically connected in series to output OUT26 and an input pin 3 of diode package U6. An output pin 1 of diode package U6 is electrically coupled to output OUT11 to serve as a source for squib testing current $I_{ST}$. An output pin 2 of diode package U6 serves as the current source for module 123.

In operation, transistors Q11 and Q12 perform as a current mirror for turning transistors Q13, and Q14 on whenever continuity voltage $V_{CONT}$ is within the load testing range (i.e., controller 70 is disarmed and squib load SQ being applied to output switch 110). Whenever transistors Q13 and Q14 are on, amber displays $LED_A$, and $LED_{A2}$ emit a steady amber light.

Build in test module 124 includes green $LED_{G1}$, green $LED_{G2}$, resistors R45–R48 (e.g., 2 KΩ resistors), a diode D14, a resistor R53 (e.g., a 20 KΩ resistor), a resistor R54 (e.g., a 4.99 KΩ resistor), a diode package U5, and a pair of p-channel E-MOSFETS Q15 and Q16. Diode D14 is electrically connected to input IN16 and a node N36. Resistor R53 is electrically connected to output OUT10 and node N36. Transistor Q15 has a gate terminal G electrically connected to node N36, a source terminal S electrically connected to common reference RET, and a drain terminal D electrically connected to a node N37.

Diode package U5 has an input pin 3 electrically connected to a node N37, an output pin 1 electrically connected to output OUT12, and an output pin 2 electrically connected to input IN13. Resistor R54 is electrically connected to node N30 and node N37. Transistor Q16 has a gate terminal G electrically connected to node N37, a source terminal S electrically connected to common reference RET, and a drain terminal D electrically connected to a node N35.

Resistor R45 and a resistor R46 are electrically connected in parallel between green display $LED_{G1}$ and node N35. Resistor R47 and resistor R48 are electrically connected in parallel between green display $LED_{G2}$ and node N35. Green displays $LED_G$, and $LED_{G2}$ are also electrically connected to node N30.

LED blinking control 125 includes a resistor R61 (e.g., a 20 KΩ resistor), a resistor R62 (e.g., a 20 KΩ resistor), a resistor R63 (e.g., a 4.99 KΩ resistor), a resistor R64 (e.g., a 100 KΩ resistor), a resistor R65 (e.g., a 249 KΩ resistor), a resistor R66 (e.g., a 499 KΩ resistor), a capacitor C26 (e.g., a 0.47 µF capacitor), a diode D15, a comparator U8, and a p-channel E-MOSFET Q17.

Resistor R61 is electrically connected to output OUT10 and a node N38. Resistor R62 is electrically connected to output OUT10 and a node N39. Resistor R63 is electrically connected to node N38 and a node N39. Resistor R64 is electrically connected to node N39 and a node N41. Capacitor C26 is electrically connected to a node N40 and a node N41. Diode D15 and resistor R65 are electrically connected in series to node N38 and a node N40. Resistor R66 is electrically connected to node N38 and a node N40.

Comparator U8 has a non-inverting input electrically connected to node N39, an inverting input electrically connected to node N40, and an output electrically connected to node N38. Transistor Q17 has a gate terminal G electrically connected to node N48 N38 a source terminal S electrically connected to common reference RET, and a drain terminal D electrically connected to a node N37.

Battery test module 126 includes a resistor R55 (e.g., a 1 MΩ resistor), a resistor R56 (e.g., a 1 MΩ resistor), a resistor R57 (e.g., a 1 MΩ resistor), a resistor R58 (e.g., a 10 MΩ resistor), a resistor R59 (e.g., a 1 KΩ resistor), a resistor R60 (e.g., a 1 KΩ resistor), a capacitor C25 (e.g., a 0.1 µF capacitor), and a comparator U7.

Resistors R55 and R56 are electrically connected in series to input IN14 and a node N42. Capacitor C25 and resistor R57 are electrically connected in parallel to node N42 and common reference RET.

Comparator U7 has a non-inverting input electrically connected to a resistor R59, which is also electrically connected to node N42. Comparator U7 has an inverting input electrically connected to a resistor R60, which is also electrically connected to a regulated voltage $V_{REG}$. Comparator U7 has an output electrically connected to output OUT12. Resistor R58 is electrically connected to node N42 and output OUT12.

In operation, green displays $LED_{G1}$ and $LED_{G2}$ emit a flashing green light whenever arming signals ARM1 and ARM3 indicate that the test monitor is switched to the armed mode, primary voltage V exceeds a voltage threshold, and backup voltage $V_{BS}$ exceeds a voltage threshold applied to comparator U7. A flashing rate of the green light is controlled by a switching frequency of transistor Q17 (e.g., 1.1 Hz).

The present invention may be embodied in other specific forms without departing from its characteristics. The described embodiments are to be considered in all respects only as illustrative and not restrictive. In particular, the exemplary voltages, currents, resistance and capacitance were provided herein to facilitate a making and a using of a squib firing device constructed in accordance with the present invention by one skilled in the art. In practice, the actual design of a squib firing device constructed in accordance with the present invention will be dependent upon numerous operational and environmental factors as would be appreciated by one skilled in the art. The scope of the invention is, therefore, indicated by the appended claims rather than by the foregoing description. All changes that come within the meaning and range of equivalency of the claims are to be embraced within their scope.

What is claimed is:

1. A squib firing system, comprising:
a squib load;
a system power source for generating a first voltage; and
a squib firing device in electrical communication with said system power source to receive the first voltage, said squib firing device operable to be switched between a first plurality of modes including an armed mode, said squib firing device including
a battery source for generating a second voltage, and
a power supply in electrical communication with said battery source to receive the second voltage,
wherein, in response to said squib firing device being switched to the armed mode and in response to an absence of said squib load being applied to said squib firing device, said power supply implements an analog OR of the first voltage and the second voltage to yield and store a squib firing power, and
wherein, in response to said squib firing device being switched to the armed mode and in response to said squib load being applied to said squib firing device, said power supply discharges the squib firing power to establish a flow of a squib firing current through said squib load, the squib firing current for firing said squib load.

2. The squib firing system of claim 1,
wherein the first plurality of modes includes a disarmed mode; and
wherein said squib firing device establishes a flow of a squib testing current through said squib load in response to said squib firing device being switched to the disarmed mode and in response to said squib load being applied to said squib firing device, the squib testing current for detecting a resistance of said squib load.

3. The squib firing system of claim 1, further comprising:
a switching apparatus in electrical communication with said squib firing device and said squib load, said switching apparatus operable to be switched between a second plurality of modes including
an isolation mode for impeding an application of said squib load to said squib firing device, and
a coupling mode for applying said squib load to said squib firing device.

4. A squib firing device, comprising:
a battery source for generating a second voltage; and
a squib controller in electrical communication with a power source to receive a first voltage, said squib controller operable to be switched between a plurality of modes including an armed mode, said squib controller including a power supply in electrical communication with said battery source to receive the second voltage,
wherein, in response to said squib controller being switched to the armed mode and in response to an absence of a squib load being applied to said controller, said power supply implements an analog OR of the first voltage and the second voltage to yield and store a squib firing power, and
wherein, in response to said squib controller being switched to the armed mode and in response to squib load being applied to said squib controller, said power supply discharges the squib firing power to establish a flow of a squib firing current through said squib load, the squib firing current for firing said squib load.

5. The squib firing device of claim 4,
wherein the plurality of modes includes a disarmed mode; and
wherein said squib controller establishes a flow of a squib testing current through squib load in response to said squib controller being switched to the disarmed mode and in response to squib load being applied to said squib controller, the squib testing current for detecting a resistance of squib load.

6. The squib firing device of claim 5, further comprising:
an operational monitor for sensing a flow of the squib testing current through squib load; and
a LED display for emitting a light output in response to a sensing of the squib testing current by said operational monitor, the light output being indicative of a detected resistance of squib load.

7. The squib firing device of claim 4, further comprising:
an operational monitor for sensing the first voltage being above a first voltage level and for sensing the second voltage being above a second voltage level; and
a LED display for emitting a light output in response to a sensing by said operational monitor of at least one of the first voltage being above the first voltage level and the second voltage being above the second voltage level, the light output being indicative of a minimum voltage of the squib firing power as stored by said power supply.

8. The squib firing device of claim 4, further comprising:
a magnet; and
a magnetic switch for switching said squib controller between the first plurality of modes as a function of a spatial distance between said magnet and said magnetic switch.

9. The squib firing device of claim 4, wherein said squib controller includes:
an output filter for controlling a flow rate of the squib firing current through squib load.

10. The squib firing device of claim 4, wherein said squib controller includes:
a current controller for regulating the flow of the squib firing current through squib load.

11. A squib firing device operating between a plurality of modes including an armed mode, said squib firing device comprising:
an arming detector operable to detect a switching of said squib firing device to the armed mode;
an output switch operable to have a squib load applied to said output switch;
an interface in electrical communication with a power source to receive a first voltage;
a battery source for generating a second voltage; and
a power supply in electrical communication with said interface to receive the first voltage via the interface and in electrical communication with said battery source to receive the second voltage,
wherein, in response to a detection by said arming detector of a switching of said squib firing device to the armed mode and in response to an absence of squib load being applied to said output switch, said power supply implements an analog OR of a first voltage and the second voltage to yield and store a squib firing power, and
wherein, in response to detection by said arming detector of a switching of said squib firing device to the armed mode and in response to squib load being applied to said output switch, said power supply discharges the squib firing power to establish a flow of the squib firing current through squib load, the squib firing current for firing squib load.

12. The squib firing device of claim 11, wherein said power supply includes:

a module for implementing the analog OR of the first voltage and the second voltage to yield the squib firing power; and
a storage device in electrical communication with said module, said storage device for storing and discharging the squib firing power.

13. The squib firing device of claim 11, further comprising:
a magnet;
a mechanical arm for positioning said magnet relative to said arming detector;
wherein the plurality of modes includes a disarmed mode; and
wherein said arming detector includes a magnetic switch operable to detect a switching of said squib firing device to one of the disarmed mode and the armed mode as a function of a spatial distance between said magnet and said magnetic switch.

14. The squib firing device of claim 11, further comprising:
a magnet;
a mechanical arm for positioning said magnet relative to said arming detector;
wherein the plurality of modes includes a disarmed mode; and
wherein said arming detector includes means for detecting a switching of said squib firing device to one of the disarmed mode and the armed mode as a function of a spatial distance between said magnet and said magnetic switch.

15. The squib firing device of claim 11, wherein said output switch includes:
an output filter for controlling a flow rate of the squib firing current through squib load.

16. The squib firing device of claim 11, wherein said output switch includes:
a current controller for regulating a flow of the squib firing current.

17. The squib firing device of claim 11, wherein said output switch includes:
an output filter including means for controlling a flow rate of the squib firing current; and
a current controller including means for regulating the squib firing current.

18. The squib firing device of claim 11, further comprising:
a test monitor operable to control an emission of a first light output and a second light output,
wherein the first light output is indicative of a detected resistance of squib load, and
wherein the second light output is indicative of a minimum voltage of the squib firing power as stored by said power supply.

19. The squib firing device of claim 11, further comprising:
a test monitor including
means for controlling an emission of a first light output indicative of a detected resistance of squib load, and
means for controlling an emission of a second light output indicative of a minimum voltage of the squib firing power as stored by said power supply.

* * * * *